(12) United States Patent
Tanaka et al.

(10) Patent No.: US 7,203,250 B2
(45) Date of Patent: Apr. 10, 2007

(54) FREQUENCY ANALYSIS METHOD AND APPARATUS, AND SPECTRUM SPREADING DEMODULATION METHOD AND APPARATUS

(75) Inventors: Katsuyuki Tanaka, Kanagawa (JP); Manabu Nitta, Tokyo (JP)

(73) Assignee: Sony Corporation (JP)

( * ) Notice: Subject to any disclaimer, the term of this patent is extended or adjusted under 35 U.S.C. 154(b) by 758 days.

(21) Appl. No.: 10/362,655

(22) PCT Filed: Jul. 4, 2002

(86) PCT No.: PCT/JP02/06810

§ 371 (c)(1),
(2), (4) Date: Feb. 25, 2003

(87) PCT Pub. No.: WO03/005230

PCT Pub. Date: Jan. 16, 2003

(65) Prior Publication Data

US 2003/0185316 A1     Oct. 2, 2003

(30) Foreign Application Priority Data

Jul. 4, 2001 (JP) ............................... 2001-203193
Feb. 20, 2002 (JP) ............................... 2002-43390

(51) Int. Cl.
*H04L 27/06* (2006.01)
*H04B 1/69* (2006.01)

(52) U.S. Cl. ..................................... 375/316; 375/147

(58) Field of Classification Search ................ 375/316, 375/130, 147; 708/400, 403, 405, 404
See application file for complete search history.

(56) References Cited

U.S. PATENT DOCUMENTS 6,233,550 B1 * 5/2001 Gersho et al. ............... 704/208

FOREIGN PATENT DOCUMENTS

EP   1-031-933 A2 * 8/2000
JP   60-164868    * 8/1985

OTHER PUBLICATIONS

Coenen et al., "Novel Fast GPS/GLONASS Code-acquistion Technique using low update rate FFT," Electronics Letters, 23rd Apr. 1992, vol. 28, No. 9, pp. 863-865.*

* cited by examiner

*Primary Examiner*—Tesfaldet Bocure
(74) *Attorney, Agent, or Firm*—Lerner, David, Littenberg, Krumholz & Mentlik, LLP

(57) ABSTRACT

A method for performing frequency analysis by executing discrete Fourier transform with a smaller capacity of a memory than in usual FFT processing, without reducing the frequency resolution. A-power-of-two $N_A=2^a$ (where "a" is an integer) memories for discrete Fourier transform are prepared. A former-stage calculation step of taking out frequency components of an input signal having a-power-of-two $N_B=2^b$ (where "b" is an integer and b>a) data items, in a comb manner and of calculating $N_A$ intermediate data items and a latter-stage calculation step of applying fast Fourier transform to the intermediate data items obtained in the former-stage calculation step, by using the $N_A$ memories for discrete Fourier transform are executed $2^{b-a}$ times with the frequency components taken out in the comb manner being changed, to execute discrete Fourier transform through $2^{b-a}$ operations.

13 Claims, 19 Drawing Sheets

$W^k = \exp(-2\pi k/8)$ $W^k = \exp(-2\pi k/4)$

FIG. 19

[EXPRESSION (1)]

$$h0(i) = (r(i) + r(i+16)) + (r(i+8) + r(i+24))$$

$$h2(i) = ((r(i) + r(i+16)) - (r(i+8) + r(i+24)))W^{2i}$$

$$h1(i) = (r(i) - r(i+16))W^{i} + (r(i+8) - r(i+24))W^{i+8}$$

$$h3(i) = (((r(i) - r(i+16))W^{i} - (r(i+8) - r(i+24))W^{i+8})W^{2i}$$

WHERE, $i = 0 \sim 7$
$W = \exp(-j2\pi/32)$

[EXPRESSION (2)]

$$hp(i) = \sum_{n=0}^{3} r(i+8n)W^{(i+8n)p}$$

[EXPRESSION (3)]

$$hp(i) = \sum_{n=0}^{2^{b-a}-1} r(i+n \times 2^{a})W^{(i+n \times 2^{a})p}$$

FIG. 20

[EXPRESSION (4)]
$$F[r(n) * c(n)] \Longleftrightarrow F(k) = R(k)C(k)$$

[EXPRESSION (5)]
$$F(k) = R(k)\overline{C(k)} \quad \text{(WHERE, } ^- \text{ INDICATES COMPLEX CONJUGATE)}$$

[EXPRESSION (6)]
$$r(n) = A \cdot d(n) \cdot c(n) \cdot \cos 2\pi n \cdot f_0 + n(n)$$

[EXPRESSION (7)]
$$F[r(n) \cdot \exp(j 2\pi n f_0 + \phi_0)] = \exp(j\phi_c) R(k - k_0)$$

[EXPRESSION (8)]
$$F'(k) = R(k - k_0)\overline{C(k)}$$

[EXPRESSION (9)]
$$|f'(n)| = \sqrt{f_R'(n)^2 + f_I'(n)^2}$$

[EXPRESSION (10)]
$$\phi = \tan^{-1}(f_I'(n) / f_R'(n))$$

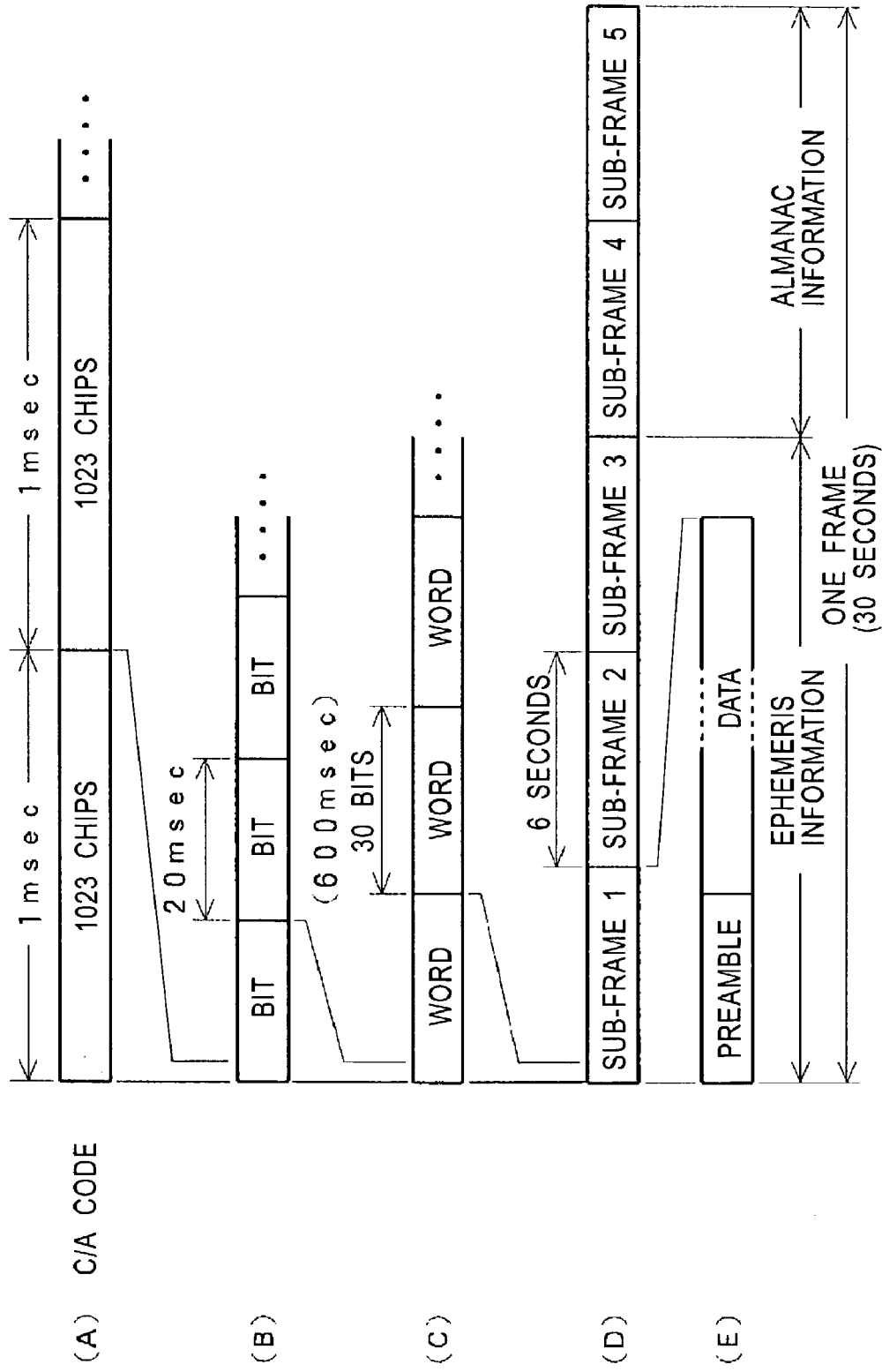

FREQUENCY ANALYSIS METHOD AND APPARATUS, AND SPECTRUM SPREADING DEMODULATION METHOD AND APPARATUS

TECHNICAL FIELD

The present invention relates to methods and apparatuses for frequency analysis using discrete Fourier transform, and to demodulation methods and apparatuses for spectrum spreading signals, such as GPS (global positioning system) satellite signals.

BACKGROUND ART

In a GPS system for measuring the position of a mobile body by using artificial satellites (GPS satellites), a GPS receiver has a basic function of receiving signals from four or more GPS satellites, calculating the position of the receiver from the received signals, and informing the user of the position.

The GPS receiver demodulates the signals sent from the GPS satellites to acquire the orbit data of the GPS satellites, and uses simultaneous equations to calculate the three-dimensional position of the receiver from the orbits and time information of the GPS satellites, and the delay time of the received signals. The reason why four GPS satellites from which signals are received are required is to remove the effect of an error between the time used in the GPS receiver and the time used by the satellites.

A commercially available GPS receiver receives a spectrum spreading signal radio wave called a C/A (clear and aquisition) code in an L1 band from a GPS satellite (Navstar) to perform calculations for position measurement.

The C/A code is a PN (pseudorandom noise) sequence code having a transmission-signal speed (chip rate) of 1.023 MHz and a code length of 1023, such as a Gold code, and is a signal obtained by BPSK (binary phase shift keying) modulating a carrier wave (hereinafter called a carrier) having a frequency of 1575.42 MHz by a signal obtained by spreading data of 50 bps. In this case, since the code length is 1023, a PN-sequence code is repeated in the C/A code with 1023 chips being used as one period (therefore, one period is equal to 1 millisecond), as shown in FIG. 21(A).

The PN-sequence code in the C/A code differs in each GPS satellite. The GPS receiver can detect in advance a PN-sequence code used by each GPS satellite. In addition, the GPS receiver understands from a navigation message like that described later whether the receiver can receive a signal from each GPS satellite at the position of the receiver at the point of time. Therefore, for three-dimensional position measurement, for example, the GPS receiver receives radio waves which can be obtained at its position at the point of time from four or more GPS satellites, applies inverse spectrum spreading to the radio waves, and performs calculations for position measurement to obtain its position.

As shown in FIG. 21(B), one bit of satellite-signal data is transferred in units of 20 periods of the PN-sequence code, that is, in units of 20 milliseconds. In other words, the data transmission rate is 50 bps. The PN-sequence code in one period, that is, 1023 chips, is inverted between when the corresponding bit is "1" and when the bit is "0."

As shown in FIG. 21(C), one word is formed of 30 bits (600 milliseconds) in the GPS, and one sub-frame (six seconds) is formed of 10 words as shown in FIG. 21(D). In the first word of a sub-frame, as shown in FIG. 21(E), a preamble having a fixed bit pattern is always inserted even when data is updated, and data is transferred after the preamble.

Further, one frame (30 seconds) is formed of five sub-frames. The navigation message is transferred in units of one-frame data. First three sub-frames in one-frame data includes information unique to a satellite, called ephemeris information. The information includes a parameter used for obtaining the orbit of the satellite, and the time when the satellite sent the signal.

All GPS satellites have an atomic clock, and use common time information. The time when a GPS satellite sends a signal is synchronized with one second of the atomic clock. The PN-sequence code of a GPS satellite is generated in synchronization with the atomic clock.

Orbit information in the ephemeris information is updated in units of several hours. Until an update is performed, the same information is used. The orbit information in the ephemeris information can be stored in a memory of the GPS receiver so as to use the same information precisely for the several hours.

The navigation message included in the remaining two sub-frames in the one-frame data is information sent in common from all satellites, called almanac information. The almanac information is transferred in 25 frames, and includes rough-position information of each GPS satellite and information indicating which GPS satellite is available. The almanac information is updated by information sent from a terrestrial station. Until an update is performed, the same information is used. The almanac information can be stored in a memory of the GPS receiver so as to use the same information for several months.

To receive a signal from a desired GPS satellite to obtain the above-described data, the C/A code is phase-synchronized by using the same PN-sequence code (hereinafter, a PN-sequence code is called just a PN code) prepared in the GPS receiver as the C/A code used by the GPS satellite and to be received, to acquire the signal sent from the GPS satellite, and inverse spectrum spreading is performed. When phase synchronization with the C/A code is obtained and inverse spreading is performed, each bit is detected, and a navigation message, including time information, can be obtained from the signal sent from the GPS satellite.

The signal sent from the GPS satellite is captured by C/A-code phase synchronization search. In the phase synchronization search, correlation between the PN code of the GPS receiver and the PN code of the signal received from the GPS satellite is detected, and when a correlation value obtained as the result of correlation detection is larger than a value specified in advance, for example, it is determined that both codes are synchronized. When it is determined that they are not synchronized, the phase of the PN code of the GPS receiver is controlled by some synchronization method to synchronize the PN code of the GPS receiver with the PN code of the received signal.

Since a GPS satellite signal is obtained by BPSK modulating the carrier by a signal obtained by spreading data with a spreading code, as described above, synchronization needs to be acquired for the carrier and the data in addition to the spreading code when the GPS receiver receives the GPS satellite signal. The synchronization of the spreading code and that of the carrier cannot be performed independently.

The GPS receiver usually converts the carrier frequency of the received signal to an intermediate frequency several megahertz from the carrier frequency, and performs the above-described synchronization detection process with a signal having the intermediate frequency. The carrier in the intermediate-frequency signal mainly includes a frequency error caused by a Doppler shift corresponding to the moving speed of the GPS satellite and an error in the frequency of a local oscillator generated inside the GPS receiver when the received signal is converted to the intermediate-frequency signal.

Therefore, the carrier frequency in the intermediate-frequency signal is unknown due to these frequency-error factors, and the carrier frequency needs to be searched for. A synchronization point (synchronized phase) in one period of the spreading code depends on the positional relationship between the GPS receiver and the GPS satellite. Since this positional relationship is also unknown, some synchronization method is required, as described above.

Conventional GPS receivers use frequency search for the carrier and a synchronization method which uses a sliding correlator, a DLL (delay locked loop), and a costas loop.

When the above-described conventional method is used as a synchronization detection method, however, it is, in principle, not suited to high-speed synchronization, and to compensate this, an actual receiver needs to have multiple channels and to search for a synchronization point in parallel. When the synchronization of the spreading code and that of the carrier require time as described above, the GPS receiver has a slow response and causes inconvenience in use.

In contrast, the improvement of the capability of hardware, typical of which is DSPs (digital signal processors), has implemented a method for performing code synchronization at a high speed by using a digital matched filter which uses fast Fourier transform (hereinafter called FFT) without using a sliding correlation method like that described above.

FFT is a version of discrete Fourier transform (DFT), implemented by a higher-speed algorithm. Whereas discrete Fourier transform transforms a signal which changed in time to a signal in a frequency domain to allow frequency analysis, the FFT calculation algorithm requires the same number (memory capacity) of memories (random access memories, RAMs) as that of data items. When the number of data items is the 16-th power of two, the required capacity of a calculation RAM is about 524 KB in 32-bit calculations with the real and imaginary parts of complex numbers being included. In the present specification, the number of memories (RAMs) means the number of memory areas each used for reading and writing one data item, and corresponds to the capacity of a memory.

Since calculations are recursively performed while an input-data memory is rewritten during the calculations in the FFT calculation algorithm, output data is written into the input-data memory and the input data is not left therein. Therefore, to leave the input data, it is necessary to separately provide the input-data memory and a calculation memory, and the required RAM is doubled.

Even when it is not necessary to leave the input data, if the input data is a binary signal, for example, the required memory capacity for the input data is about 65.5 KB in the above case. Since the result of FFT is not binary and the number of bits almost equal is required, a RAM having a capacity of about 524 KB, which is larger than the amount of the input data, is needed.

In frequency analysis using usual FFT calculations, the larger the number of data items is, the higher the frequency resolution is. However, the required capacity of a RAM is increased as described above. Since the capacity of the RAM greatly affects the chip area of an LSI (large scale integrated circuit), an increase in the capacity of the RAM causes an increase in cost when a DSP is integrated into an LSI.

Therefore, a method for maintaining the frequency resolution with a small capacity of the RAM even if the calculation time is extended to some extent is demanded.

In consideration of the above points, an object of the present invention is to allow frequency analysis to be performed without reducing the frequency resolution, by performing discrete Fourier transform with a smaller capacity of a memory than when usual FFT processing is used.

DISCLOSURE OF INVENTION

To solve the foregoing issues, a frequency analysis method according to the present invention is a method using a-power-of-two $N_A=2^a$ (where "a" is an integer) memories for discrete Fourier transform, characterized in that a former-stage calculation step of taking out frequency components of an input signal having a-power-of-two $N^B=2^b$ (where "b" is an integer and b>a) data items, in a comb manner and of calculating $N_A$ intermediate data items; and a latter-stage calculation step of applying fast Fourier transform to the intermediate data items obtained in the former-stage calculation step, by using the $N_A$ memories for discrete Fourier transform are executed a predetermined number of times with the frequency components taken out in the comb manner being changed, to execute discrete Fourier transform through the predetermined number of operations.

An aspect of the present invention having the above-described structure uses a structure in which an FFT calculation process for the number $N_B$ of data items includes $2^{b-a}$ sets of FFT calculations for the number $N_A$ of data items. In other words, when frequency components of $N_B$ input data items are taken out in a comb manner so as not to overlap with each other, the latter-stage calculation processing for the taken-out results can be formed of $2^{b-a}$ sets of exactly the same FFT calculation structure (FFT calculations for the number $N_A$ of data items).

Therefore, frequency components of $N_B$ input data items can be analyzed with $N_A=2^a$ ($<N_B$) calculation memories. This means that discrete Fourier transform calculations can be performed with a smaller number of memories than in usual FFT, and frequency components can be analyzed without reducing the frequency resolution.

BRIEF DESCRIPTION OF THE DRAWINGS

FIG. 19 is a view used for describing an embodiment of the present invention.

FIG. 20 is a view used for describing an embodiment of the present invention.

FIG. 21 is a view showing the structure of a signal sent from a GPS satellite.

BEST MODE FOR CARRYING OUT THE INVENTION

Figure 1:
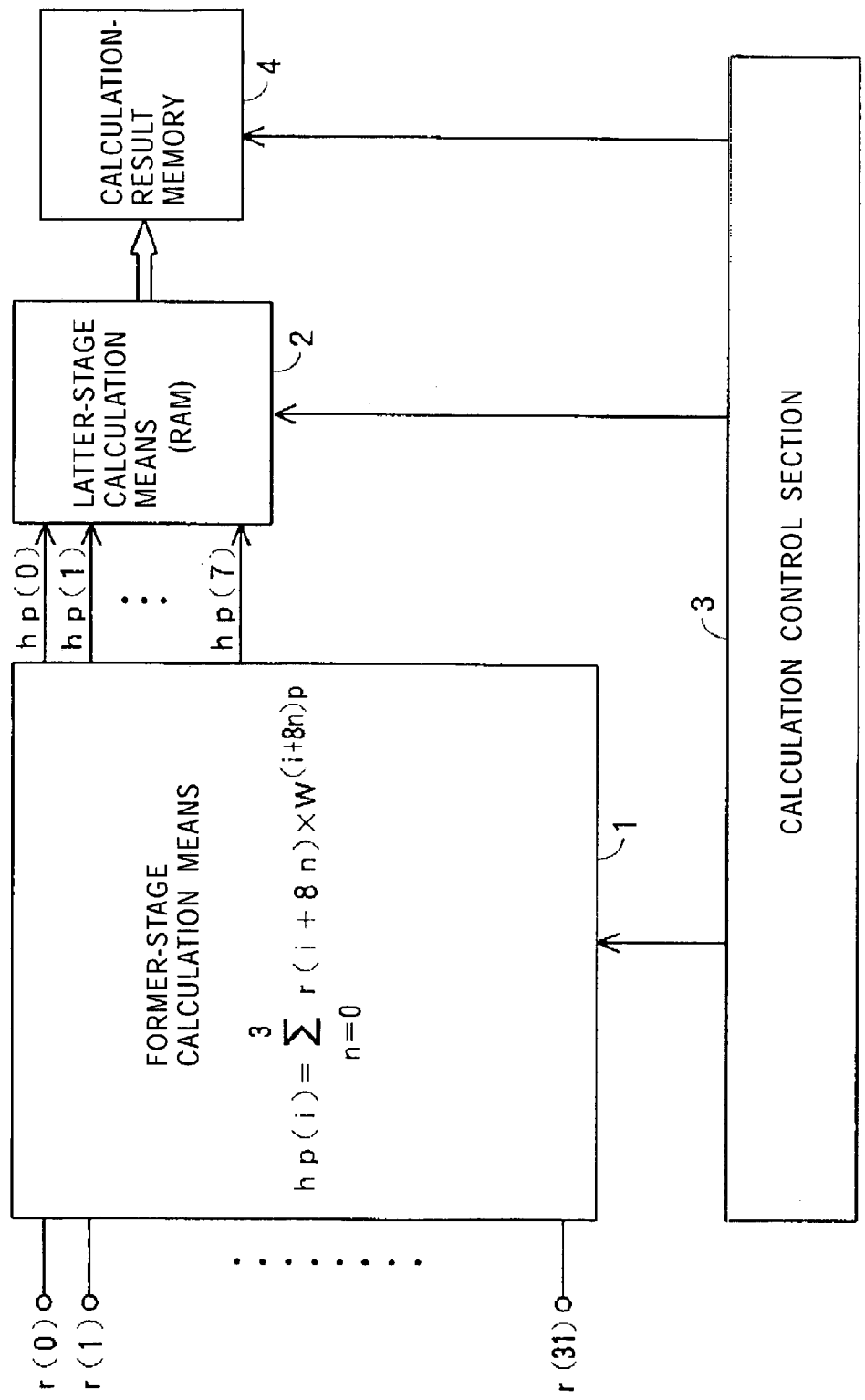
FIG. 1 is a block diagram showing a frequency analysis apparatus according to a first embodiment of the present invention.

A case in which a frequency analysis method and a spectrum-spreading-signal demodulation method according to the present invention are applied to a GPS receiver is taken as an embodiment and will be described below by referring to the drawings.

Frequency Analysis Method According to First Embodiment

An outline and the operation principle of a frequency analysis method according to a first embodiment of the present invention will be described first. In the following description, it is assumed that an input signal having the number $N_B$ of data items is Fourier transformed for frequency analysis by using the number $N_A$ of calculation memories (RAMs). In the present specification, the number of memories (RAMs) means the number of memory areas each used for reading and writing one data item.

The input signal having the number $N_B$ of data items is called r(n), the result obtained by applying discrete Fourier Transform (DFT) thereto is called R(k), "n" indicates a discrete time, and "k" indicates a discrete frequency, where "n" and "k" range from zero to $N_B-1$, and $N_B$ is $2^b$ ("b" is an integer). The number $N_A$ of calculation memories which can be used in a discrete Fourier transform process is set to $2^a$ ("a" is an integer).

To calculate the result R(k) of discrete Fourier transform of the input signal r(n) by usual fast Fourier transform (FFT), at least $N_A=N_B$ RAMs are required to store halfway calculation data and the final result. In other words, input signals r(0) to r($N_B-1$) are stored in $N_B$ RAMs, the contents of the RAMs are rewritten in the process of FFT calculations, and the final RAM values indicate R(0) to R($N_B-1$).

In this case, since input-signal data is lost, it is necessary to separately provide RAMs for input-signal storage and those for FFT calculations to save the input signal. There is no special problem in the required capacity of the RAMs when the number $N_B$ of data items in the result R(n) of discrete Fourier transform is small.

When the number $N_B$ of data items increases, however, the capacity of the RAMs also increases and the chip area required for the corresponding LSI is also increases. This is undesirable. In addition, since the input data r(n) and the result R(k) of discrete Fourier transform do not necessarily have the same signal level (number of bits) as is typically in a case when the input data r(n) is a binary signal, there is a case in which it is realistic that RAMs for storing the input data r(n) and RAMs for FFT calculations are separately provided.

It is not necessary to leave all of the result R(k) of discrete Fourier transform if an object is to detect an unspecific frequency peak. In this case, when a method is used in which R(k) is calculated from r(n) according to the definition expression of discrete Fourier transform, and the result is sequentially checked for k=0 to $N_B=1$, since sum-of-products calculations are performed while input data is read into a general-purpose register, calculation RAMs are not required. In this case, however, since the high-speed FFT algorithm cannot be used, and the amount of calculations becomes extraordinary large. If the number of data items is large, this method is unrealistic in terms of a calculation time.

In the embodiment described below, a method is used in which discrete-Fourier-transform calculations are performed with the high-speed FFT algorithm being left and the required capacity of RAMs being reduced. To reduce the required capacity of RAMs to a level of $N_A<N_B$, that is, a<b, calculations for obtaining R(k) from r(n) are performed in a plurality of stages as in the following procedure.

In this case, there are separately provided RAMs for storing the input signal r(n) and calculation RAMs for the result R(k) of discrete Fourier transform. To divide calculations for obtaining the result R(k) of discrete Fourier transform into calculations in a plurality of stages, a point that an FFT calculation process for the number $N_B$ of data items includes $2^{b-a}$ sets of FFT calculations for the number $N_A$ of data items is used. An example will be shown below.

Figure 2:
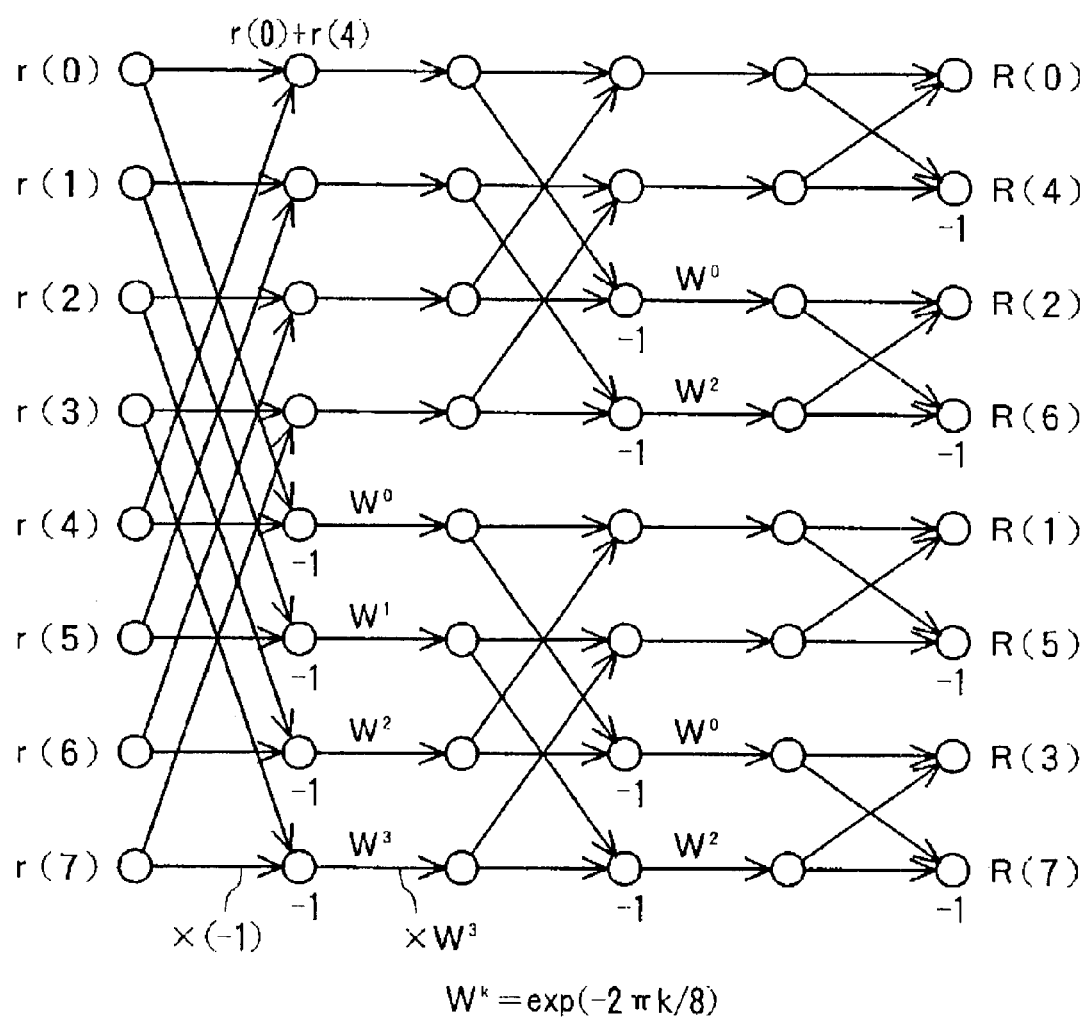
FIG. 2 is a view showing an FFT signal flow, used for describing a frequency analysis method according to the first embodiment of the present invention.

FIG. 2 is a view showing an FFT signal flow in a case in which an input signal has eight ($N_A=8$, a=3) data items. There are shown input signals r(0) to r(7) at the left end and the results R(0) to R(7) of discrete Fourier transform at the right end.

Figure 3:
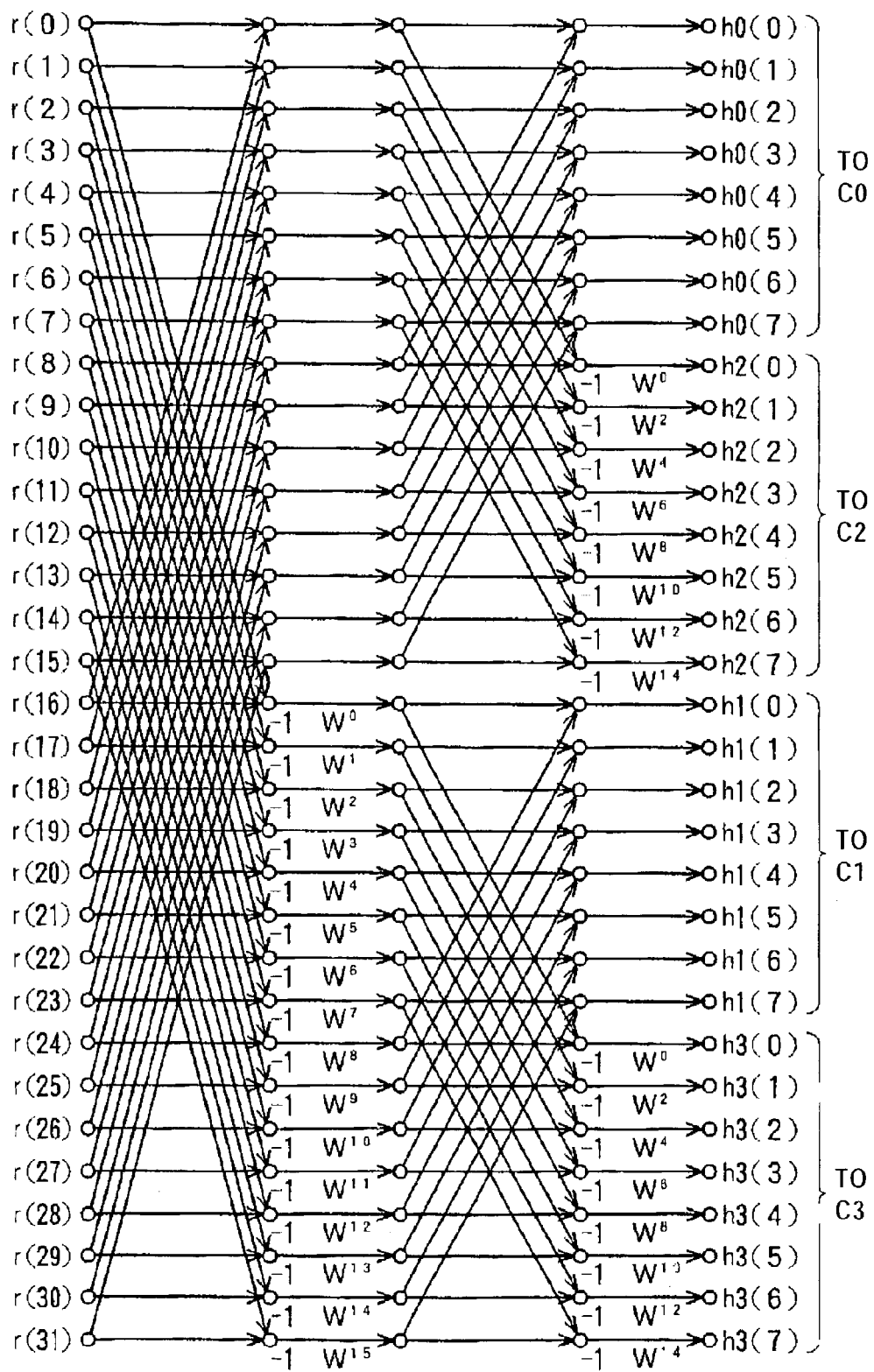
FIG. 3 is the former part of a view showing an FFT signal flow, used for describing the frequency analysis method according to the first embodiment of the present invention.
Figure 4:
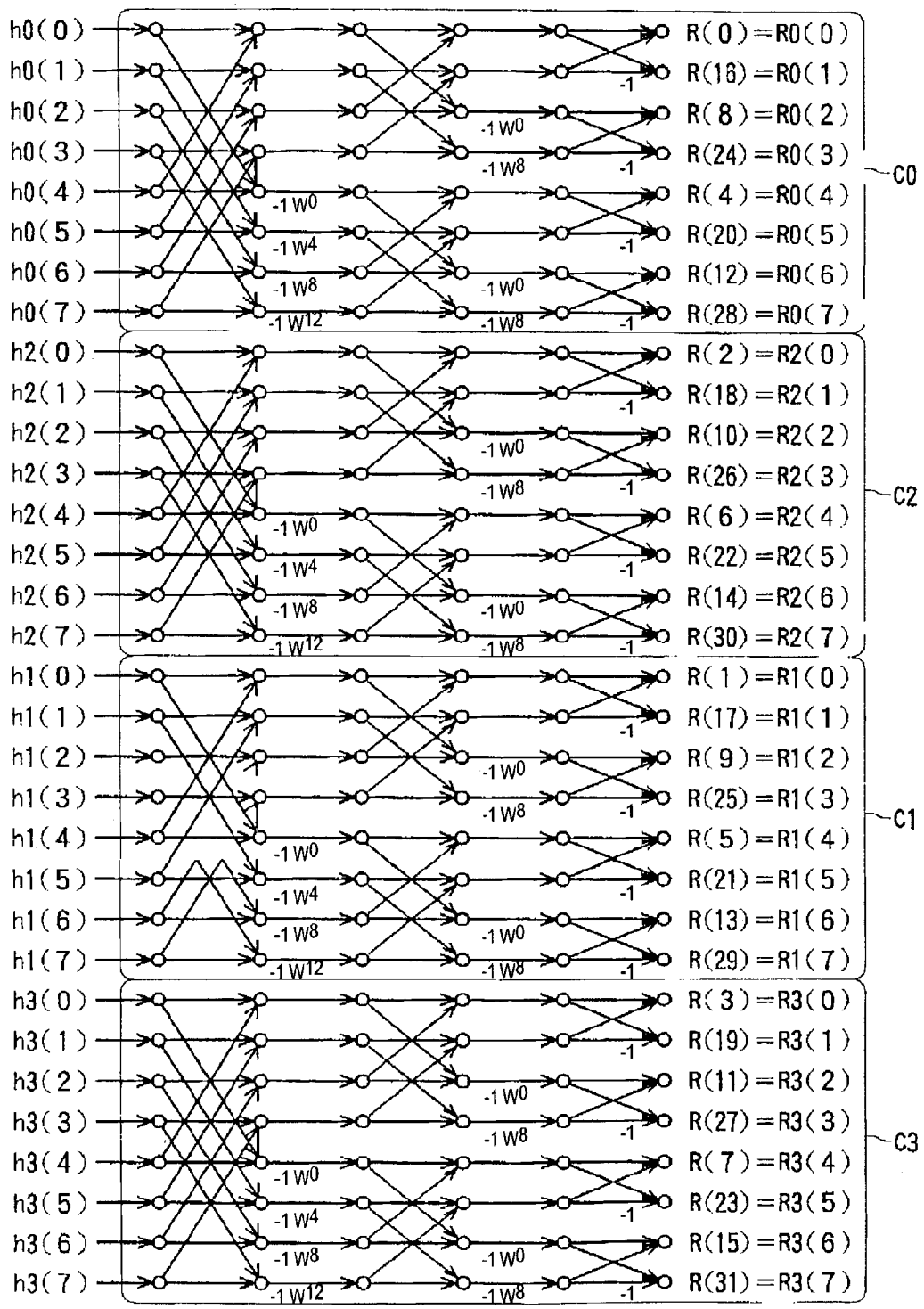
FIG. 4 is the latter part of the view showing an FFT signal flow, used for describing the frequency analysis method according to the first embodiment of the present invention.

FIG. 3 and FIG. 4 are views showing an FFT signal flow in a case in which an input signal has 32 ($N_B=32$, b=5) data items. FIG. 3 shows the first-half part of the signal flow view, and there are shown input signals r(0) to r(31) at the left end and intermediate calculation values h0(0) to h0(7), h1(0) to h1(7), h2(0) to h2(7), and h3(0) to h3(7) at the right end. FIG. 4 shows the second-half part, and there are shown the intermediate calculation values h0(0) to h0(7), h1(0) to h1(7), h2(0) to h2(7), and h3(0) to h3(7) at the left end and the results R(0) to R(31) of discrete Fourier transform at the right end.

When FIG. 2 is compared with FIG. 4, it is understood that each of four signal-flow portions C0, C1, C2, and C3 enclosed by thin lines in FIG. 4 has the same form as the signal-flow view of FIG. 2. More specifically, the four signal-flow portions C0, C1, C2, and C3 respectively have the intermediate calculation values h0(0) to h0(7), h1(0) to h1(7), h2(0) to h2(7), and h3(0) to h3(7) as their inputs, and R0(0) to R0 (7), R1(0) to R1(7), R2(0) to R2(7), and R3(0) to R3(7) as their outputs, and the same calculation procedure as that shown in FIG. 2 is applied in the four signal-flow portions C0, C1, C2, and C3 although their inputs and outputs differ from each other.

As shown in FIG. 4, C0, C1, C2, and C3, and h0(0) to h0(7), h1(0) to h1(7), h2(0) to h2(7), and h3(0) to h3(7) can be expressed by Cp and hp(0) to hp(7), where "p" (in the case shown in FIG. 4, "p"=0 in C0, "p"=1 in C1, "p"=2 in C2, and "p"=3 in C3) is the minimum value of "k" in R(k) included in the outputs R0(0) to R0(7), R1(0) to R1(7), R2(0) to R2(7), and R3(0) to R3(7) of the signal-flow portions C0, C1, C2, and C3.

A coefficient W shown in FIG. 2 is expressed by:

$$W = \exp(-j2\pi/8) \quad \text{(expression a)}$$

and a coefficient W shown in FIG. 3 and FIG. 4 is expressed by:

$$W = \exp(-j2\pi/32) \quad \text{(expression b)}$$

according to the number of input data items for each case. Therefore, calculations performed in FIG. 3 and those performed in the latter stages C0, C1, C2, and C3 of FIG. 4 are exactly the same. In the above expressions, "j" in "j2π" indicates the imaginary unit.

As shown in FIG. 4, "k" increases from the minimum value "p" at an interval of four in the result R(k) of discrete Fourier transform included in the outputs R0(0) to R1(7), R1(0) to R1(7), R2(0) to R2(7), and R3(0) to R3(7) of the signal-flow portions C0, C1, C2, and C3.

In other words, the result R(k) of discrete Fourier transform included in the outputs R0(0) to R0(7), R1(0) to R1(7), R2(0) to R2(7), and R3(0) to R3(7) of the signal-flow portions C0, C1, C2, and C3 is arranged at a constant interval of kd=4.

Therefore, the result R(k) of discrete Fourier transform included in the outputs R0(0) to R0(7), R1(0) to R1(7), R2(0) to R2(7), and R3(0) to R3(7) of the signal-flow portions C0, C1, C2, and C3 includes frequency components taken out in a comb manner from the frequency components of r(n) having 32 input data items so as not to overlap with each other.

This is a characteristic derived from a point that FFT calculations includes multiplications of a complex sine wave and additions or subtractions of a delayed signal in each stage. From FIG. 4, hp(0) to hp(7) are expressed by expression (1) in FIG. 19. Expression (1) of FIG. 19, "i" in hp(i) is 0, 1, 2, . . . , and 7, and W=exp(−j2π/32). The expression (1) can be expressed collectively by expression (2) in FIG. 19.

In this case, When $W^0$ to $W^{15}$ are stored in a ROM (read only memory) as in usual FFT, calculations related to W can be performed by using the relationships of $W^{16} = -1$ and $W^{32} = 1$.

According to the above description, in the first embodiment, calculations for discrete Fourier transform can be applied to input data r(n) with a memory (RAM) having a smaller capacity than in usual FFT by using a frequency analysis apparatus having a structure shown in FIG. 1. Frequency components can be analyzed without reducing the frequency resolution.

Specifically, the frequency analysis apparatus shown in FIG. 1 is formed of former-stage calculation means 1 for calculating an intermediate calculation value hp(i) (in this case, h0(0) to h0(7), h1(0) to h1(7), h2(0) to h2(7), and h3(0) to h3(7)) from input data r(n) (in this case, r(0) to r(31)), latter-stage calculation means 2 provided with RAMs used for FFT calculations applied to the intermediate calculation value hp(i), a calculation control section 3, and a calculation result memory 4.

Under the control of the calculation control section 3, the former-stage calculation means 1 reads input data r(i+8n) into a general-purpose register, multiplies it by a W term, accumulates the product in an accumulator to calculate the intermediate calculation values hp(0) to hp(7), as shown in FIG. 3.

The eight intermediate calculation value data items, which are the results of calculations, are written into eight data calculation RAMs constituting the latter-stage calculation means 2. The eight data items written into the RAMs are converted to Rp(0) to Rp(7) by the FFT algorithm under the control of the calculation control section 3.

In FIG. 1, R0(0) to R0(7) corresponding to p=0 are first obtained, checked, and a peak larger than a threshold, for example, is stored in the memory 4 or output to the outside. Then, "p" is changed to one, two, and three, calculations are sequentially performed to obtain R1(0) to R1(7), R2(0) to R2(7), and R3(0) to R3(7) by the repetition of calculations in the same calculation RAMs for eight data items, and frequency components thereof are sequentially checked. With this, 32 frequency components R(0) to R(31) can be finally analyzed.

The foregoing description corresponds to a case in which $N_A = 8$, a=3, $N_B = 32$, and b=5. Expression (2) in the foregoing calculation processing can be generalized to obtain expression (3) shown in FIG. 19.

Since hp(i) in expression (2) and expression (3) indicates the signal obtained by applying inverse discrete Fourier transform to a signal having discrete frequency components (in the above case, at an interval of four), such as Rp(0) to Rp(7) shown in FIG. 3 and FIG. 4, hp(i) corresponds to a time waveform obtained when passing through a comb filter.

In the same way as in the above-described case, when the results Rp(0) to Rp($2^a-1$) of calculations performed $2^{b-a}$ times with "p" being set to zero to $2^{b-a}-1$ are sequentially checked in the discrete Fourier transform calculations generalized in this way, the same number of calculation RAMs as the number of data items $N_A = 2^a$ can be used to analyze $N_B = 2^b$ frequency components R(0) to R($2^b-1$), where $N_B$ is larger than $N_A$.

Figure 5:
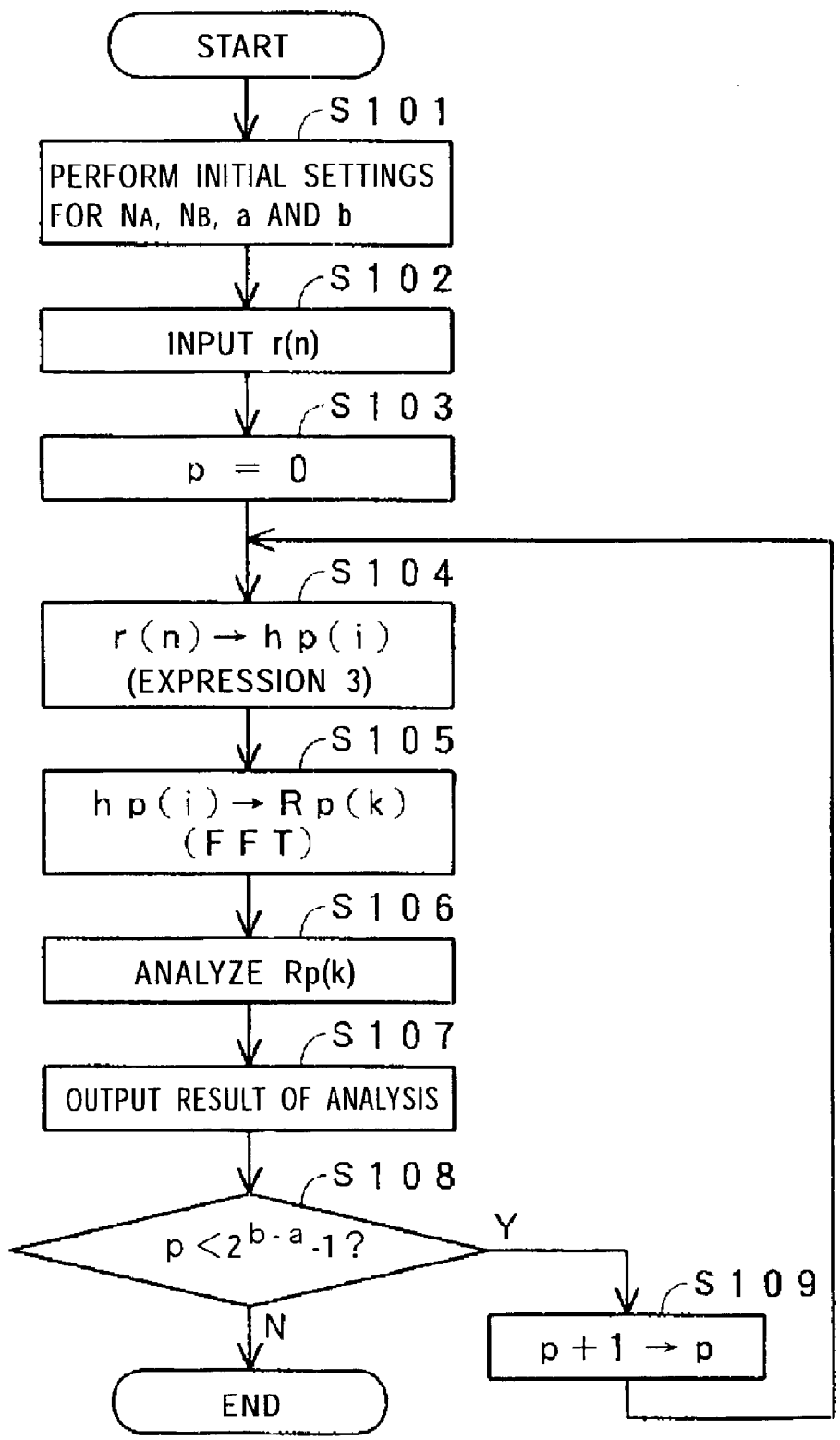
FIG. 5 is a flowchart used for describing the frequency analysis method according to the first embodiment of the present invention.

FIG. 5 shows an example flowchart of the frequency analysis method described above.

The values of $N_A$, $N_B$, "a," and "b" are first specified as initial settings (step S101). Then, input data r(n) is input. In the case shown in FIG. 1, the input data r(n) is input to the former-stage calculation means 1 (step S102).

Next, "p" is set to 0 to specify the first signal-flow portion C0 among signal-flow portions Cp (p=0 to $2^{b-a}-1$) where frequency components are taken out in a comb manner (step S103). Then, a general-purpose register is used to obtain an intermediate calculation value hp(i) according to the above-described expression (3) (step S104).

Next, the obtained intermediate calculation value hp(i) is written into the same number of calculation RAMs as the number of data items $N_A=2^a$, and FFT calculations are performed to obtain Rp(k) (step S105). The obtained Rp(k) is frequency-analyzed (step S106), and the result of analysis is written into a memory or output to the outside (step S107).

Next, it is determined whether the variable "p" is smaller than its maximum value $2^{b-a}1$ (step S108). When the variable "p" is smaller than $2^{b-a}-1$, the variable "p" is incremented by one (step S109), the procedure returns to step S104, and the processes of step S104 and subsequent steps are repeated.

With the above-described method, a smaller number of calculation RAMs than the number of input data items are used for discrete Fourier transform calculations to analyze the same number of frequency components as the number of the input data items. In a case where $N_A=4,096$, a=12, $N_B=65,536$, and b=16, the required number of calculation RAMs is one sixteenth that for usual FFT calculations.

When the number of times complex-number multiplications are performed is compared between usual FFT and the above-described method according to the present invention, calculations are performed $4.9 \times 10^5$ times in the former case whereas calculations are performed $1.4 \times 10^6$ times in the method according to the present invention, which is about three times larger. The method needs, however, a much smaller amount of calculations than that, $4.3 \times 10^9$, required for calculations performed according to the definition expression of discrete Fourier transform, and the latter-stage FFT calculation greatly makes the calculations faster.

In FIG. 1, the former calculation means 1 performs FFT calculations for each of the signal-flow portions C0, C1, C2, and C3 to obtain eight intermediate calculation values, writes the obtain intermediate calculation values in the RAMs of the latter-stage calculation means 2 to execute FFT calculations. The structure of the circuits can be changed as shown in FIG. 6.

Figure 6:
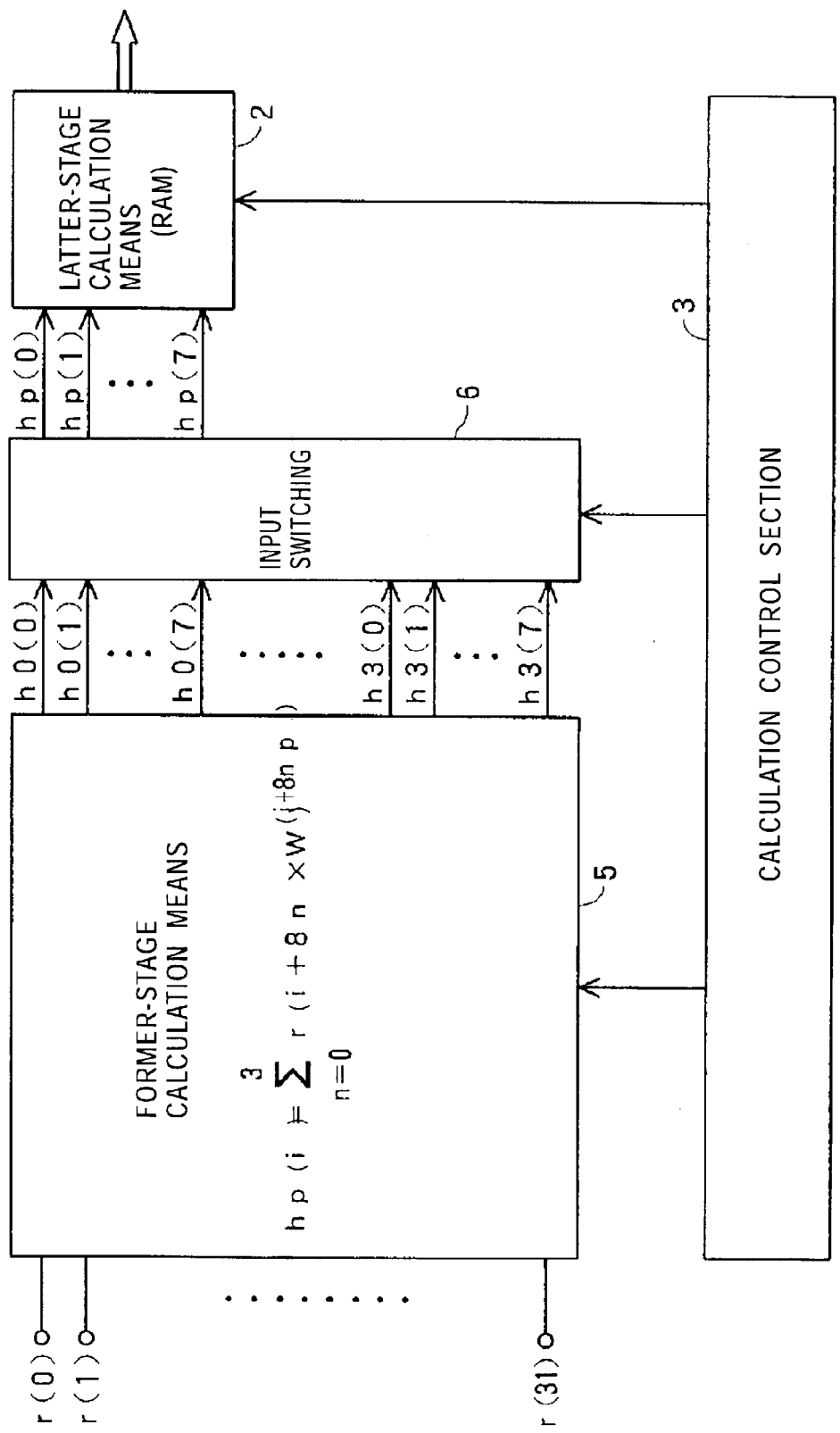
FIG. 6 is a block diagram showing another frequency analysis apparatus according to the first embodiment of the present invention.

In a case shown in FIG. 6, a former-stage calculation means 5 obtains all intermediate calculation values sent to the signal-flow portions C0, C1, C2, and C3. The intermediate calculation values are sequentially written into RAMs of a latter-stage calculation means 2 in units of eight values through an input switching section 6 so as to be suited to FFT processing performed in the RAMs of the latter-stage calculation means 2.

Second Embodiment of Frequency Analysis Method

An outline and the operation principle of a frequency analysis method according to a second embodiment of the present invention will be described first. Also in this case, it is assumed that an input signal having the number $N_B$ of data items is Fourier transformed for frequency analysis by using the number $N_A$ of calculation memories (RAMs).

As described before, the frequency analysis method according to the first embodiment requires an increased number of complex-number multiplications, about slightly less than three times that required in usual FFT. A frequency analysis method according to the second embodiment improves this point.

Specifically, the second embodiment provides a method for performing at a higher speed comb-filter calculations and calculations using FFT both described in the first embodiment. As described later, an input signal is limited to a real signal (signal having no imaginary part, such as a signal received from a GPS satellite) in order to reduce the number of times the comb-filter calculations and FFT calculations are performed.

Also in the second embodiment, to divide calculations for obtaining the result R(k) of discrete Fourier transform into calculations in a plurality of stages, a point that FFT calculations for the number $N_B$ of data items include $2^{b-a}$ sets of FFT calculations for the number $N_A$ of data items is used. An example will be shown below.

Figure 7:
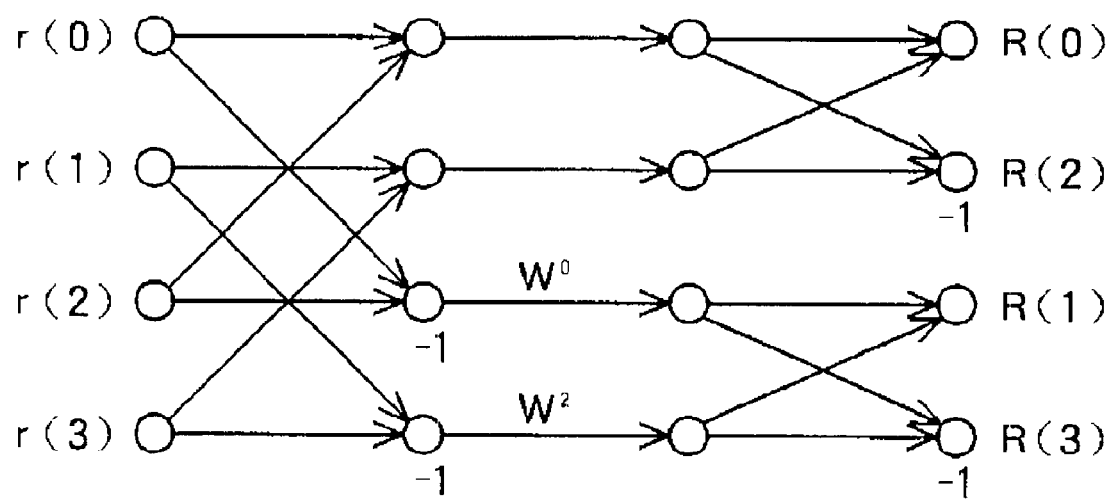
FIG. 7 is a view showing an FFT signal flow, used for describing a frequency analysis method according to a second embodiment of the present invention.

FFT calculations for $N_A$ data items according to the second embodiment are performed as shown in FIG. 7. Specifically, FIG. 7 is a view showing an FFT signal flow in a case in which an input signal has four ($N_A=4$, a=2) data items. There are shown input signals r(0) to r(3) at the left end and the results R(0) to R(3) of discrete Fourier transform at the right end.

Figure 8:
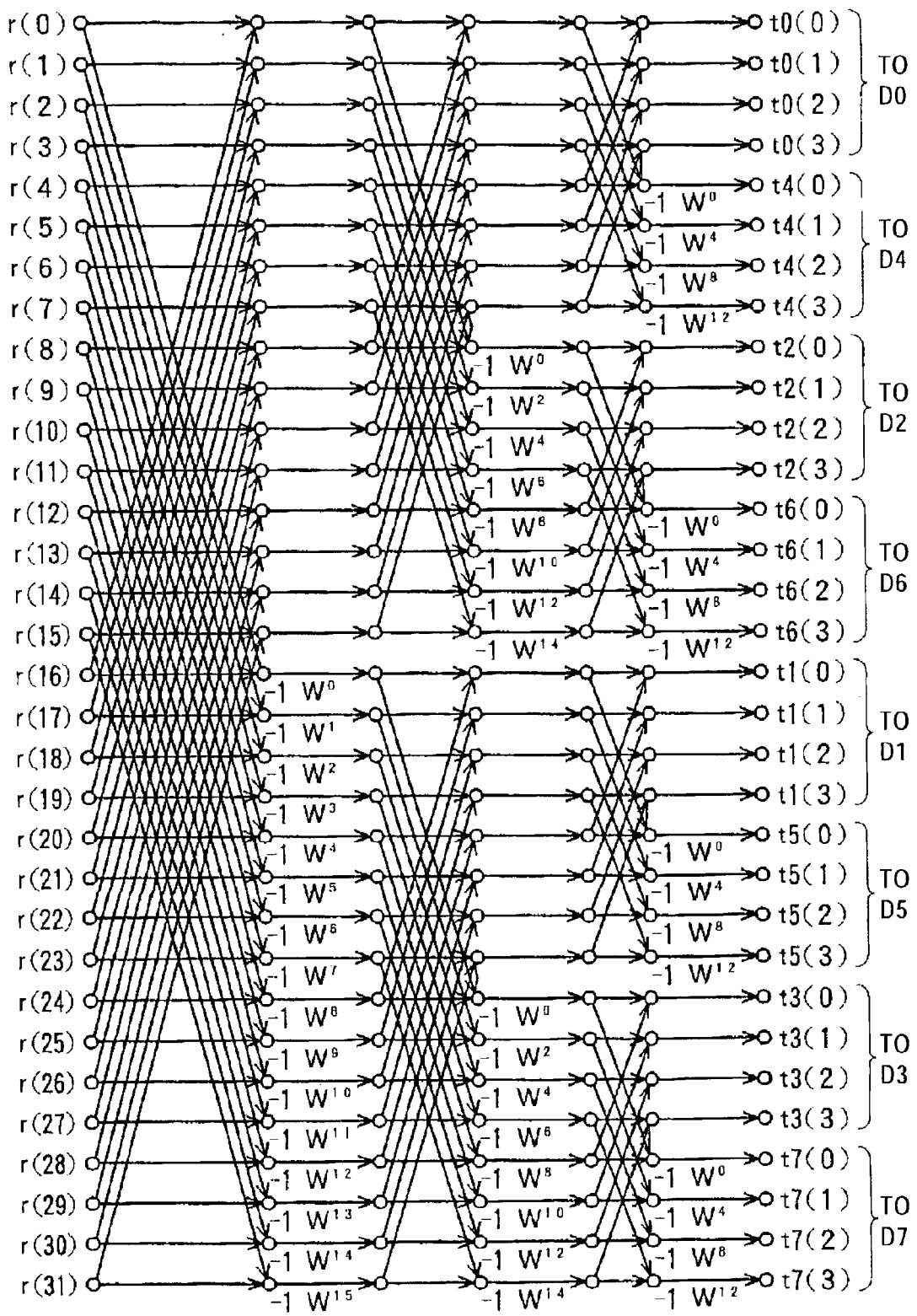
FIG. 8 is the former part of a view showing an FFT signal flow, used for describing the frequency analysis method according to the second embodiment of the present invention.
Figure 9:
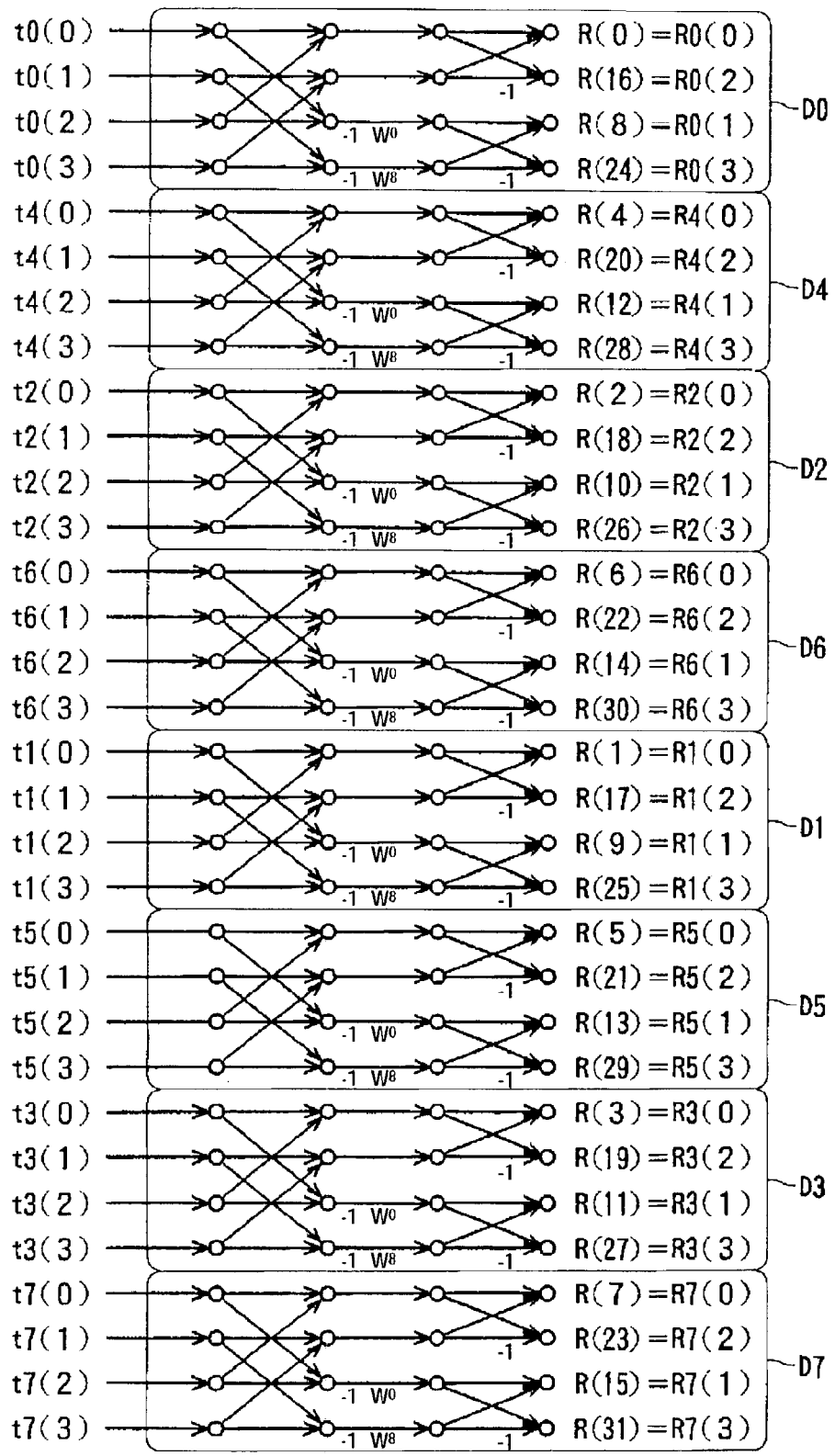
FIG. 9 is the latter part of the view showing an FFT signal flow, used for describing the frequency analysis method according to the second embodiment of the present invention.

FIG. 8 and FIG. 9 are views showing an FFT signal flow in a case in which an input signal has 32 ($N_B=32$, b=5) data items, which was described before and shown in FIG. 3 and FIG. 4. In the case shown in FIG. 8 and FIG. 9 in the second embodiment, the first-half part of the signal-flow view shown in FIG. 8 and the second-half part shown in FIG. 9 differ from the case shown in FIG. 3 and FIG. 4 in the first embodiment.

FIG. 8 shows the first-half part of the signal flow view, and there are shown input signals r(0) to r(31) at the left end and intermediate calculation values t0(0) to t0(3), t1(0) to t1(3), t2(0) to t2(3), t3(0) to t3(3), t4(0) to t4(3), t5(0) to t5(3), t6(0) to t6(3), and t7(0) to t7(3) at the right end.

FIG. 9 shows the second-half part of the signal-flow view, and there are shown the intermediate calculation values t0(0) to t0(3), t1(0) to t1(3), t2(0) to t2(3), t3(0) to t3(3), t4(0) to t4(3), t5(0) to t5(3), t6(0) to t6(3), and t7(0) to t7(3) at the left end and the results R(0) to R(31) of discrete Fourier transform at the right end.

When FIG. 7 is compared with FIG. 9, it is understood that each of eight signal-flow portions D0, D1, D2, D3, D4, D5, D6, and D7 enclosed by thin lines in FIG. 9 has the same form as the signal-flow view of FIG. 7. More specifically, the eight signal-flow portions D0, D1, D2, D3, D4, D5, D6, and D7 respectively have t0(0) to t0(3), t1(0) to t1(3), t2(0) to t2(3), t3(0) to t3(3), t4(0) to t4(3), t5(0) to t5(3), t6(0) to t6(3), and t7(0) to t7(3) as their inputs, and R0(0) to R0(3), R1(0) to R1(3), R2(0) to R2(3), R3(0) to R3(3), R4(0) to R4(3), R5(0) to R5(3), R6(0) to R6(3), and R7(0) to R7(3) as their outputs, the same calculation procedure is applied in the eight signal-flow portions D0, D1, D2, D3, D4, D5, D6, and D7 although their inputs and outputs differ from each other.

As shown in FIG. 9, D0, D1, D2, D3, D4, D5, D6, and D7, and t0(0) to t0(3), t1(0) to t1(3), t2(0) to t2(3), t3(0) to t3(3), t4(0) to t4(3), t5(0) to t5(3), t6(0) to t6(3 t7(0) to t7(3) can be expressed by Dq and tq(0) to tq(3), where "q" (in the case shown in FIG. 9, "q"=0 in D0, "q"=1 in D1, "q"=2 in D2, "q"=3 in D3, "q"4 in D4, "q"=5 in D5, "q"=6 in D6, and "q"=7 in D7) is the minimum value of "k" in R(k) included in the outputs R0(0) to R0(3), R1(0) to R1(3), R2(0) to R2(3), R3(0) to R3(3), R4(0) to R4(3), R5(0) to R5(3), R6(0) to R6(3), and R7(0) to R7(3) of the signal-flow portions D0, D1, D2, D3, D4, D5, D6, and D7.

A coefficient W shown in FIG. 7 is expressed by:

$$W = \exp(-j2\pi/4) \qquad \text{(expression a)}$$

and a coefficient W shown in FIG. 8 and FIG. 9 is expressed by:

$$W = \exp(-j2\pi/32) \qquad \text{(expression b)}$$

according to the number of input data items for each case. Therefore, calculations performed in FIG. 7 and those performed in the latter stages D0, D1, D2, D3, D4, D5, D6, and D7 of FIG. 9 are exactly the same. In the above expressions, "j" in "j2π" indicates the imaginary unit.

As shown in FIG. 9, "k" increases from the minimum value "q" at an interval of eight in the result R(k) of discrete Fourier transform included in the outputs R0(0) to R0(3), R1(0) to R1(3), R2(0) to R2(3), R3(0) to R3(3), R4(0) to R4(3), R5(0) to R5(3), R6(0) to R6(3), and R7(0) to R7(3) of the signal-flow portions D0, D1, D2, D3, D4, D5, D6, and D7.

In other words, the result R(k) of discrete Fourier transform included in the outputs R0(0) to R0(3), R1(0) to R1(3), R2(0) to R2(3), R3(0) to R3(3), R4(0) to R4(3), R5(0) to R5(3), R6(0) to R6(3), and R7(0) to R7(3) of the signal-flow portions D0, D1, D2, D3, D4, D5, D6, and D7 is arranged at a constant interval of k=8.

Therefore, the result R(k) of discrete Fourier transform included in the outputs R0(0) to R0(3), R1(0) to R1(3), R2(0) to R2(3), R3(0) to R3(3), R4(0) to R4(3), R5(0) to R5(3), R6(0) to R6(3), and R7(0) to R7(3) of the signal-flow portions D0, D1, D2, D3, D4, D5, D6, and D7 includes frequency components taken out in a comb manner from the frequency components of r(n) having 32 input data items so as not to overlap with each other.

Figure 10:
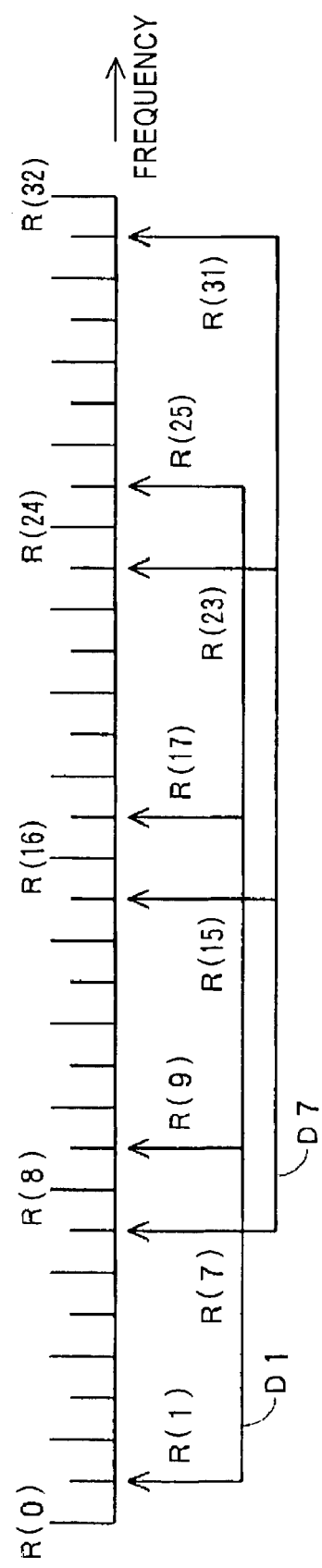
FIG. 10 is a view used for describing the frequency analysis method according to the second embodiment of the present invention.

For example, FIG. 10 shows the relationship between the signal-flow portion D1 and the signal-flow portion D7. As clearly shown in FIG. 10, the result R(k) of discrete Fourier transform included in the results R1(0) to R1(3) of discrete Fourier, included in the signal-flow portion D1 and the results R7(0) to R7(3) of discrete Fourier, included in the signal-flow portion D7 differs in that "k" in R(k) is apart from each other by seven. The results do not overlap with each other, and include frequency components taken out in a comb manner.

Therefore, also in the second embodiment, since the former-stage calculation means obtains the intermediate value tq(m) (where m is an integer equal to or larger than zero, and in this case, M=0, 1, 2, or 3) from the input data r(n), and the latter-stage calculation means having RAMs used for applying FFT calculations to the intermediate calculation value tq(m) sequentially calculates D0 to D7, discrete Fourier transform calculations can be applied to the input data r(n) with a smaller number of memories (RAMs) than in usual FFT, and frequency components can be analyzed without reducing the frequency resolution.

However, the same problem as in the above-described first embodiment occurs in this condition. In the second embodiment, in a case in which an input signal is limited to a real signal having no imaginary part, since the case has a characteristic described later, the latter-stage calculation means performs FFT calculations only for the signal-flow portions D0 to D4 among the signal-flow portions D0 to D7 to obtain the results of FFT calculations for all the signal-flow portions D0 to D7. The calculation processing speed is made faster by this technique. A method for making the calculation processing speed faster in the second embodiment will be described below.

When a signal having no imaginary part is converted to a signal in the frequency domain, it is generally known that the real part of the result R(k) of conversion is an even function and the imaginary part is an odd function. In this case, the following expressions are satisfied.

$Rr(k)=Rr(N_B-k)$ (expression c)

$Ri(k)=Ri(N_B-k)$ (expression d)

where, Rr(k) and Ri(k) indicate the real part and the imaginary part of R(k), respectively, and $N_B$ indicates the number of data items.

The signal-flow portions D1 and D7 shown in FIG. 9 are:

$$D1 = \{R1(0), R1(1), R1(2), R1(3)\}$$
$$= \{R(1), R(9), R(17), R(25)\}$$
$$D7 = \{R7(0), R7(1), R7(2), R7(3)\}$$
$$= \{R(7), R(15), R(23), R(31)\}$$

From the expression c, the following expression is satisfied.

$$R7(0) = R7r(0) + jR7i(0)$$
$$= Rr(7) + jRi(7)$$
$$= Rr(25) - jRi(25)$$
$$= R1r(3) - R1i(3)$$
$$= R1'(3)$$

where, "j" is the imaginary unit, Rxr(k) and Rxi(k) indicate the real part and the imaginary part of Rx(k), respectively, and Rx'(k) indicates Rx(k) in which the sign of the imaginary part is inverted.

In the same way, the following expressions are also satisfied.

$R7(1)=R1'(2)$ $R7(2)=R1'(1)$ $R7(3)=R1'(0)$

Then, the following expression is obtained.

$R7(m)=R40(N_c-1-m)$ $(0 \leq m < N_c)$ where, $N_c$ indicates the number of data items in a signal-flow portion.

In the same way, the following relationships are satisfied between the signal-flow portions D2 and D6, and the signal-flow portions D3 and D5.

$R6(m)=R2'(N_c-1-m)$ $R5(m)=R3'(N_c-1-m)$

Such a relationship is not satisfied between the signal-flow portions D0 and D4. In a more generalized manner, such a relationship is not satisfied between D0 and D[n/2] in n signal-flow portions.

As described above, when the signs of the imaginary parts of the elements of the FFT result obtained in each of some portions of the signal-flow portions D0 to D7 are inverted and the arrangement order of the elements are inverted, the elements become equal to the elements of the FFT result obtained in another signal-flow portion. More specifically, when the results of FFT calculations are obtained in the signal-flow portions D1, D2, and D3, the results of FFT calculations for the signal-flow portions D7, D6, and D5 can be obtained by inverting the signs of the imaginary parts of the elements of the FFT results obtained in the signal-flow portions D1, D2, and D3 and by inverting the arrangement order of the elements.

Therefore, when the whole of the input signal is FFT processed and converted to signals in the frequency domain, if FFT calculations are performed only in the signal-flow portions D0 to D4 among the eight signal-flow portions D0 to D7, the results of the remaining signal-flow portions D5 to D7 can be easily calculated from the results of FFT calculations in the signal-flow portions D1 to D3. Consequently, FFT calculations for the signal-flow portions D5 to D7, and comb filter calculations used for obtaining inputs to the signal-flow portions D5 to D7 can be omitted.

With this, according to the second embodiment, FFT can be performed a higher speed than in the first embodiment with the amount of use memory and the frequency resolution being about equal to those in the first embodiment. When the number of complex-number multiplications is compared among usual FFT, the first embodiment, and the second embodiment, in a case in which $N_A$ is set to 4,096 and $N_B$ is set to 65,536, for example, whereas the usual FFT requires $4.9 \times 10^5$ multiplications, and the first embodiment needs $1.4 \times 10^6$ multiplications, which is about slightly less than three times those in the usual FFT, the second embodiment just requires $7.9 \times 10^5$ multiplications, which is about 1.6 times those required in the usual FFT.

Figure 11:
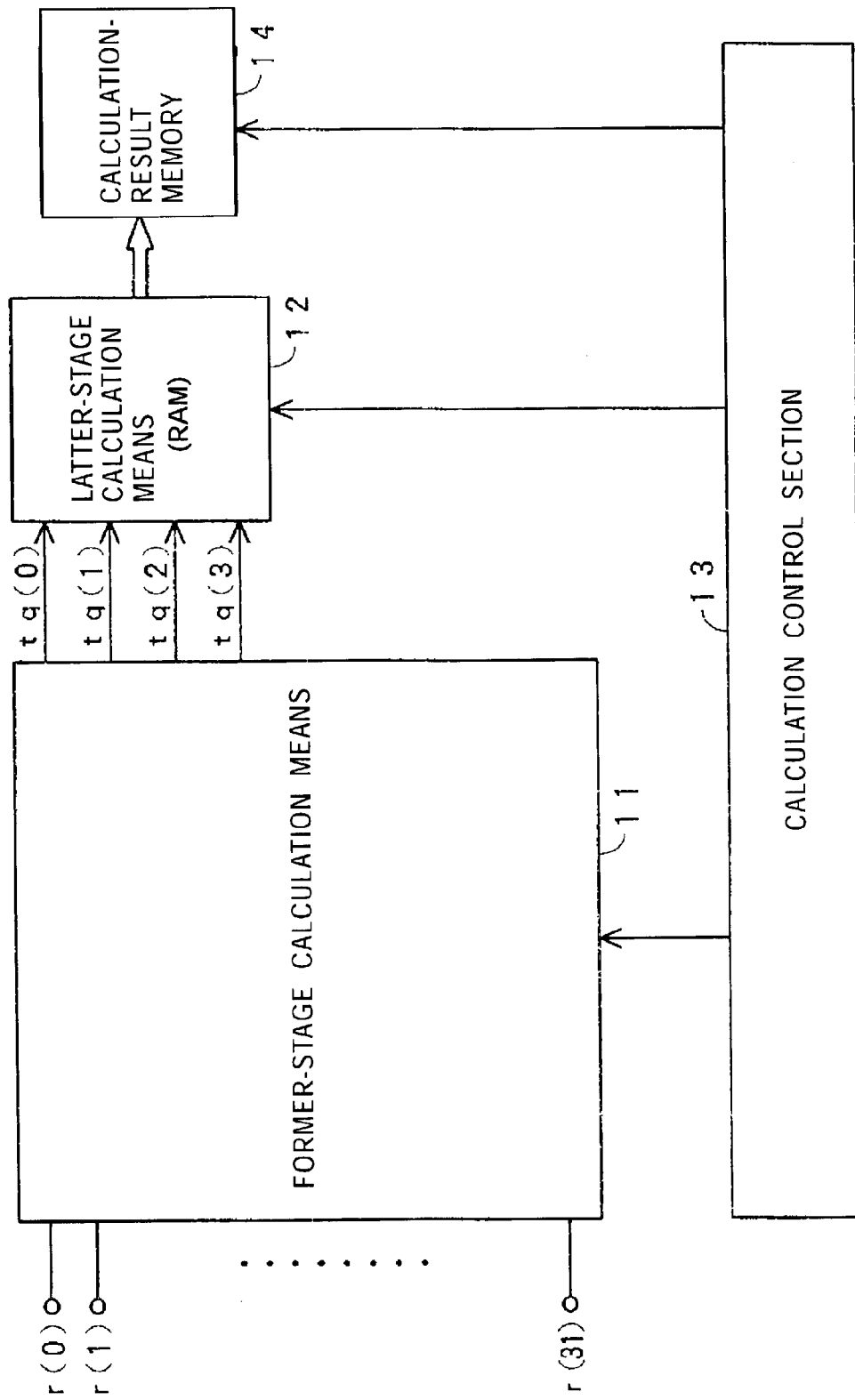
FIG. 11 is a block diagram showing a frequency analysis apparatus according to the second embodiment of the present invention.

From the above description, with the use of a frequency analysis apparatus having a structure shown in FIG. 11, discrete Fourier transform calculations can be applied to input data r(n) at a high speed with a small number of memories (RAMs) as in usual FFT, and frequency components can be analyzed at a high speed without reducing the frequency resolution.

Specifically, the frequency analysis apparatus shown in FIG. 11 is formed of former-stage calculation means 11 for calculating an intermediate calculation value tq(m) (in the case shown in FIG. 8 and FIG. 9, $0 \leq q \leq 4$, $0 \leq m \leq 3$) from input data r(n) (in the case shown in FIG. 8 and FIG. 9, r(0) to r(31)), latter-stage calculation means 12 provided with RAMs used for FFT calculations applied to the intermediate calculation value tq(m) (in the case shown in FIG. 8 and FIG. 9, $0 \leq q \leq 4$, $0 \leq m \leq 3$), for inverting the arrangement orders of the elements of obtained FFT results and inverting the signs of the imaginary parts to obtain the results of other FFT calculations, a calculation control section 13, and a calculation result memory 14.

Under the control of the calculation control section 13, the former-stage calculation means 11 reads input data r(n) into a general-purpose register, multiplies it by a W term, accumulates the product in an accumulator to calculate the intermediate calculation values tq(m), as shown in FIG. 8. The intermediate calculation value tq(m) is not calculated for all in $0 \leq q \leq (Q-1)$ (where Q indicates the number of signal-flow portions having $N_A$ data items, and in the case described above, Q=8), but in $0 \leq q \leq Q/2$. More specifically, in the case shown in FIG. 8 and FIG. 9, five sets of intermediate calculation values t0(0) to t0(3), t1(0) to t1(3), t2(0) to t2(3), t3(0) to t3(3), and t4(0) to t4(3) input to the signal-flow portions D0 to D4.

The (Q/2+1) sets of intermediate calculation value data, which is the result of calculations, are written into m data calculation RAMs constituting the latter-stage calculation means 12. The m data written into the RAMs are converted to Rq(m) by the FFT algorithm under the control of the calculation control section 13.

In the results of calculations, R1(m) to R[Q/x−1] (m) among Rq(m), the arrangement order of the elements thereof are reversed, and the signs of the imaginary parts are also inverted to calculate the results of FFT calculations, R[Q/2+1] (m) to R[Q−1] (m) in the latter-stage calculation means 12.

In the case described above by referring to FIG. 8 and FIG. 9, the results of FFT calculations, R0(0) to R0(3), corresponding to q=0 are first obtained in FIG. 11, checked, and a peak larger than a threshold, for example, is stored in the memory 14 or output to the outside. Then, the results of FFT calculations, R1(0) to R1(3), corresponding to q=1 are first obtained, checked, and a peak larger than a threshold, for example, is stored in the memory 14 or output to the outside.

Next, the arrangement order of the elements of the results of FFT calculations, R1(0) to R1(3), corresponding to q=1 is inverted, and the signs of the imaginary parts of the elements are inverted to obtain the results of FFT calculations, R7(0) to R7(3), corresponding to q=7. They are checked, and a peak larger than a threshold, for example, is stored in the memory 14 or output to the outside.

Next when q=2 and q=3, calculations are performed in the same way as in the case of q=0 to obtain R2(0) to R2(3) and R3(0) to R3(3) by the repetition of calculations in the same calculation RAMs for four data items, and frequency components therefor are sequentially checked. The results are stored in the memory 14 or output to the outside.

Then, the arrangement order of the elements of each of the results of FFT calculations, R2(0) to R2(3) and R3(0) to R3(3) is inverted, and the signs of the imaginary parts of the elements are inverted to obtain the results of FFT calculations, R6(0) to R6(3) and R5(0) to R5(3), corresponding to q=6 and q=5. They are checked, and a peak larger than a threshold, for example, is stored in the memory 14 or output to the outside.

At the end, the results of FFT calculations, R4(0) to R4(3), corresponding to q=4 are obtained, checked, and a peak larger than a threshold, for example, is stored in the memory 14 or output to the outside. With this, frequency analysis has been applied to 32 frequency components R(0) to R(32).

Figure 12:
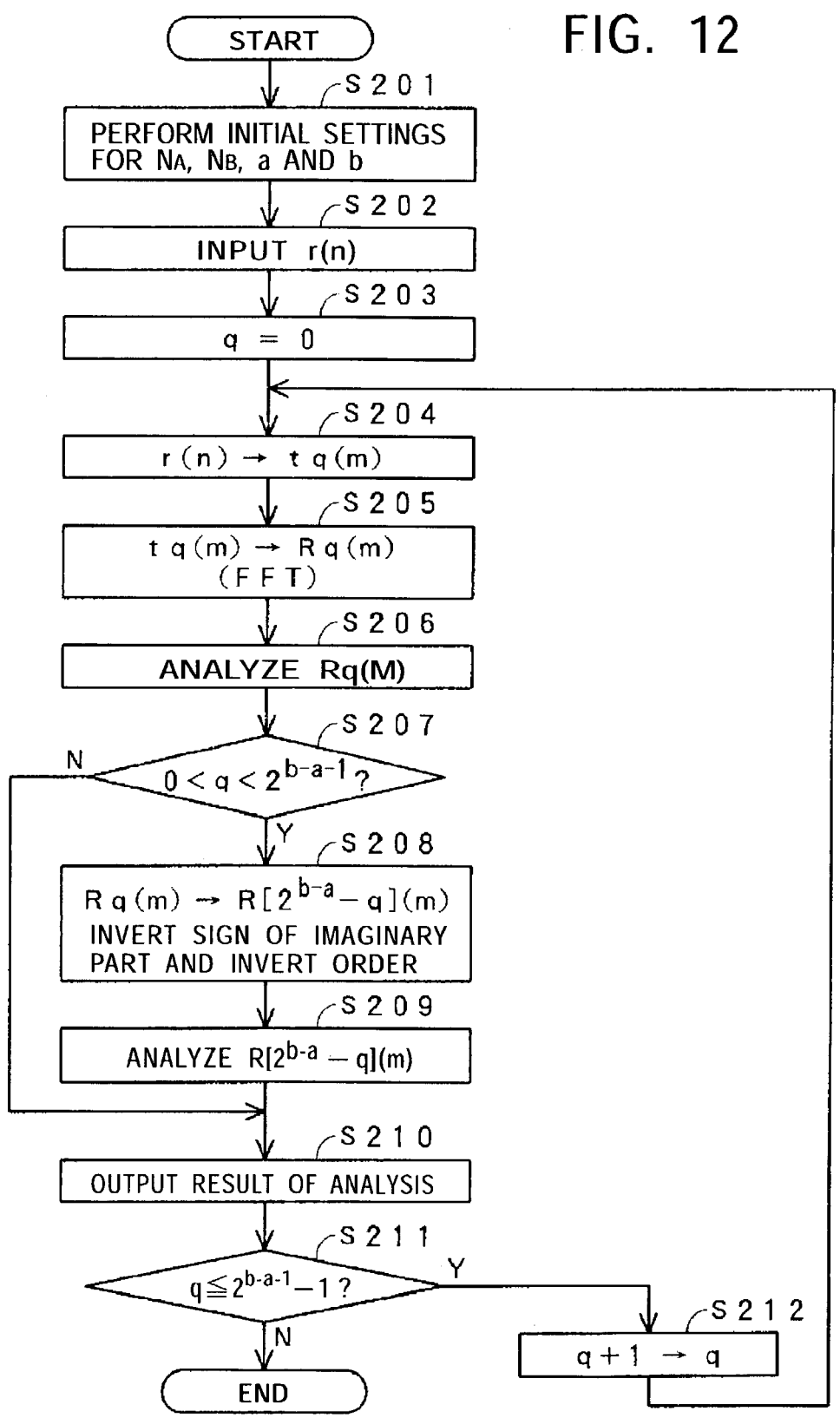
FIG. 12 is a flowchart used for describing the frequency analysis method according to the first embodiment of the present invention.

FIG. 12 shows an example flowchart of the frequency analysis method described above. When the processing shown in the flowchart mainly corresponds to the control processing of the calculation control section 13 in the case shown in FIG. 11.

The values of $N_A$, $N_B$, "a," and "b" are first specified as initial settings (step S201). Then, input data r(n) is input. In the case shown in FIG. 11, the input data r(n) is input to the former-stage calculation means 11 (step S202).

Next, "q" is set to 0 to specify the first signal-flow portion D0 among signal-flow portions Dq (q=0 to $2^{b-a}-1$) where frequency components are taken out in a comb manner (step S203). Then, a general-purpose register is sued to obtain the intermediate calculation value tq(m) (step S204).

Next, the obtained intermediate calculation value tq(m) is written into the same number of calculation RAMs as the number of data items $N_A=2^a$, and FFT calculations are performed to obtain Rq(m) (step S205). The obtained Rp(m) is frequency-analyzed (step S206).

Next, it is determined whether the variable "q" falls in a range of $0 < q < 2^{b-a-1}$ (step S207). When the variable "q" does not fall in this range, only the result of analysis obtained in step S206 is output (step S210). In the case described above by referring to FIG. 8 and FIG. 9, it is determined in step S207 whether one of the signal-flow portions D1 to D3, where the result of FFT for another signal-flow portion is obtained by inverting the arrangement order of the elements of the result of FFT and inverting the imaginary parts, is handled.

Next, it is determined whether the variable "q" satisfies $q \leq 2^{b-a-1}-1$ (step S211). When the variable "q" does not satisfy the expression, the processing routine is terminated. When the variable "q" satisfies the expression, the variable "q" is incremented by one (step S212), the procedure returns to step S204, and the processes of step S204 and subsequent steps are repeated.

When it is determined in step S207 that the variable "q" falls in a range of $0<q<2^{b-a-1}$, the arrangement order of the elements of the result of FFT obtained at the variable "q" is inverted and the imaginary parts are also inverted to obtain the result of FFT obtained when the variable "q" is $(2^{b-a}-q)$ (step S208), and the result is frequency-analyzed (step S209). Then, in step S210, the result of analysis obtained in step S206 and the result of analysis obtained in step S209 are output. The procedure proceeds to step S211.

In FIG. 11, in the case shown in FIG. 8 and FIG. 9, the former calculation means 11 performs FFT calculations for each of the signal-flow portions D0, D1, D2, and D3 to obtain four intermediate calculation values, writes the obtain intermediate calculation values in the RAMs of the latter-stage calculation means 12 to execute FFT calculations. The structure of the circuits can be changed as shown in FIG. 13.

Figure 13:
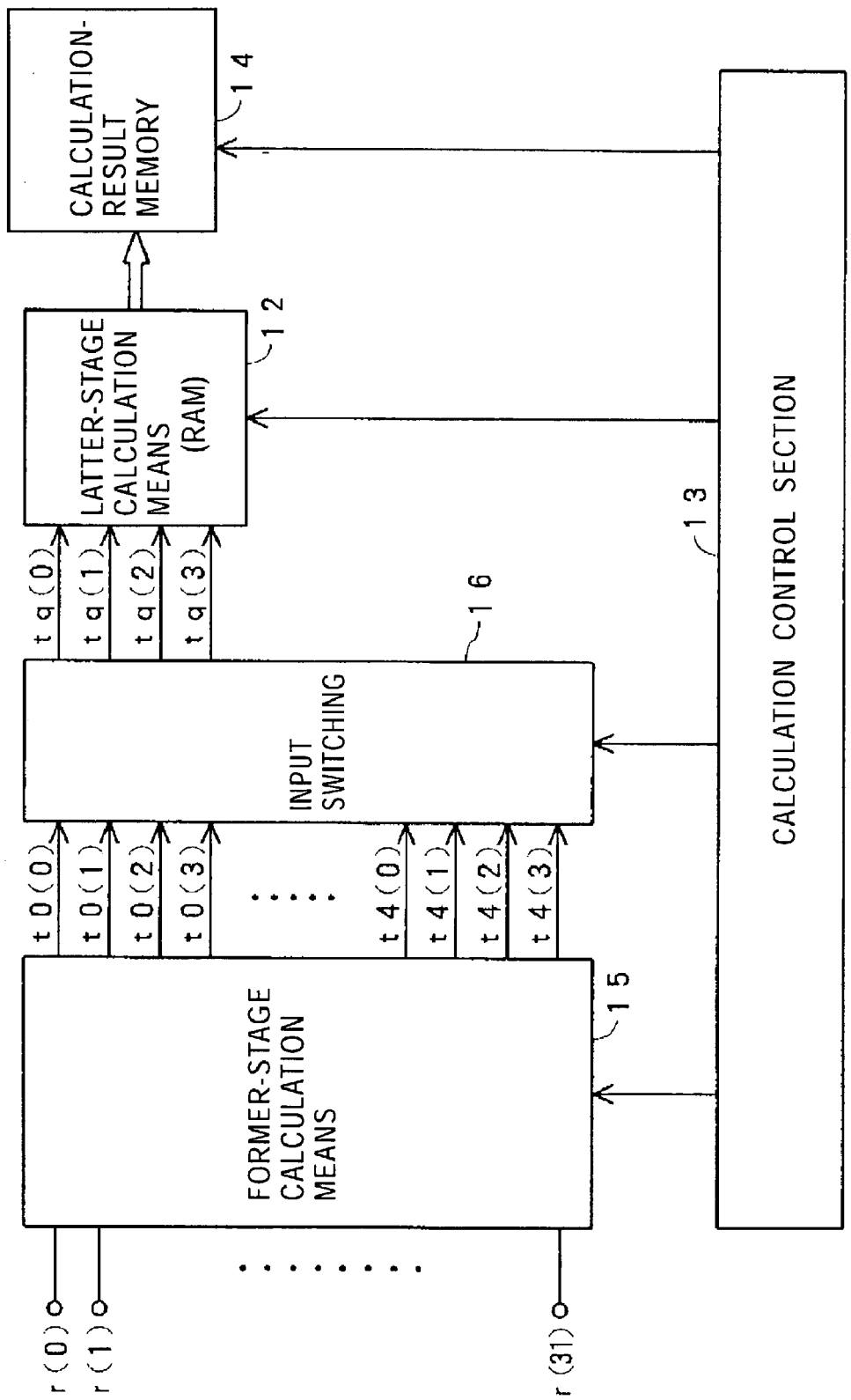
FIG. 13 is a block diagram showing another frequency analysis apparatus according to the first embodiment of the present invention.

In a case shown in FIG. 13, in the case shown in FIG. 8 and FIG. 9, a former-stage calculation means 15 obtains all intermediate calculation values t0(0) to t0(3), t1(0) to t1(3), t2(0) to t2(3), t3(0) to t3(3), and t4(0) to t4(3) sent to the signal-flow portions D0, D1, D2, D3, and D4 to which signal inputs are required. The intermediate calculation values are sequentially written into RAMs of a latter-stage calculation means 12 in units of four values through an input switching section 16 so as to be suited to FFT processing performed in the RAMs of the latter-stage calculation means 12.

Example Structure of a GPS Receiver

The frequency analysis method in the present embodiment described above is used for demodulation of spectrum spreading signals in a GPS receiver to make the structure of a DSP 100 simple and to allow high-speed processing to be expected. An example structure of a GPS receiver serving as a spectrum-spreading-signal demodulation apparatus according to an embodiment to which a frequency analysis method according to the present invention is applied will be described below.

Figure 14:
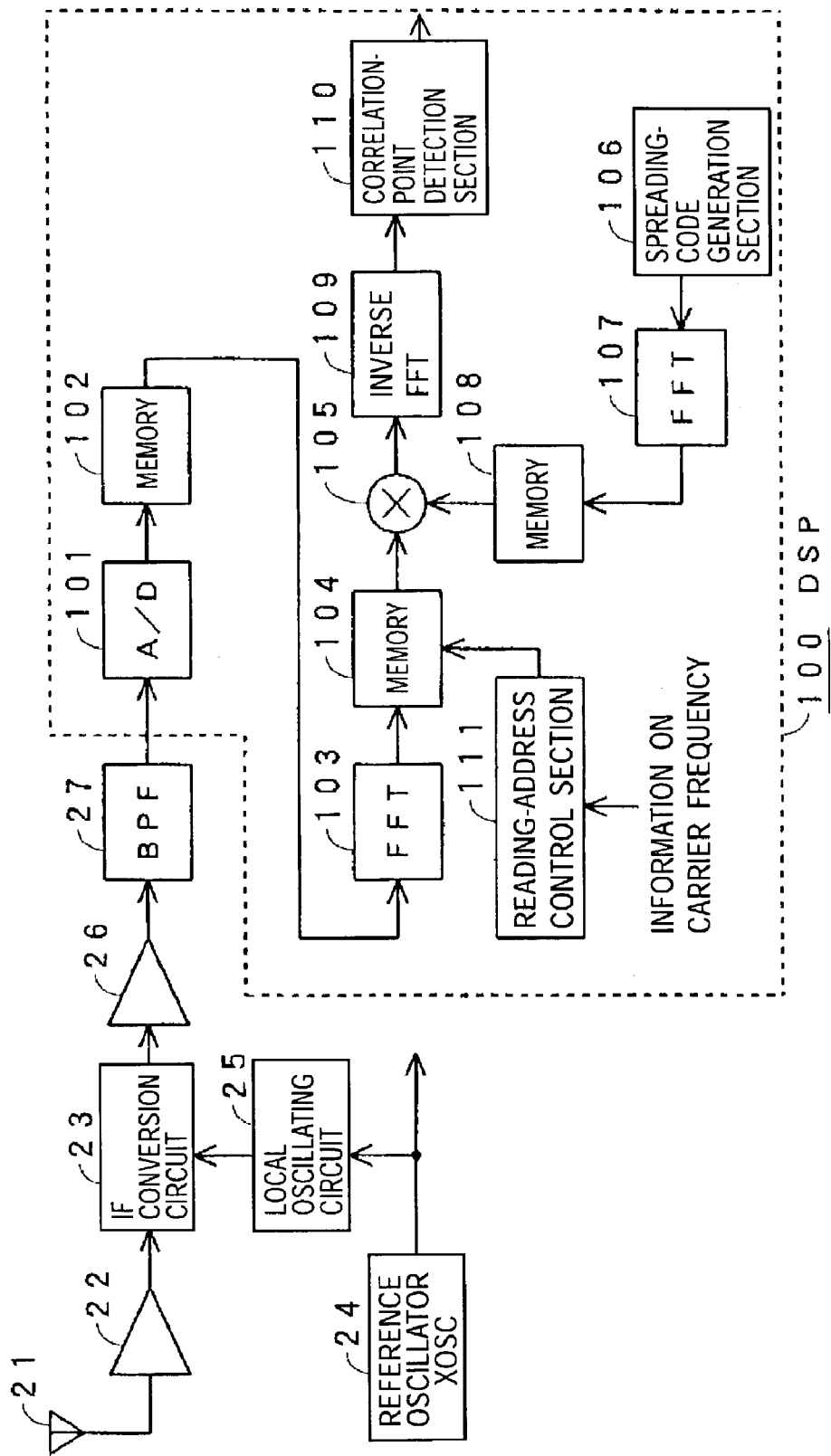
FIG. 14 is a block diagram showing the structure of a GPS receiver serving as a spectrum spreading-signal demodulation apparatus according to an embodiment of the present invention.

FIG. 14 is a block diagram showing an example structure of the GPS receiver in that case. As shown in FIG. 14, a signal (spectrum spreading signal) sent from a GPS satellite and received by an antenna 21 is sent to an intermediate-frequency conversion circuit 23 through a high-frequency amplification circuit 22. The output of a reference oscillator 24 formed of a crystal oscillator is sent to a local oscillation circuit 25. With this, a local-oscillation output is obtained in which the output frequency and the frequency ratio of the reference oscillator are fixed.

The local-oscillation output is sent to the intermediate-frequency conversion circuit 23, and a satellite signal is low-frequency-converted to an intermediate-frequency signal having an intermediate frequency of 1.023 MHz. The intermediate-frequency signal is amplified by an amplification circuit 26, its bandwidth is limited by a band-pass filter 27, and the signal is sent to a DSP (digital signal processor) 100.

A block diagram enclosed by a dotted line in FIG. 14 shows a function executed by the DSP 100 in a hardware manner. These blocks can also be structured by discrete circuits as hardware. The structure of the DSP 100 in FIG. 14 shows the structure of a digital matched filter.

The signal sent to the DSP 100 is converted to a digital signal by an A/D converter 101, and written into a buffer memory 102. The signal read from the buffer memory 102 is sent to an FFT processing section 103. In this case, the FFT processing section 103 applies FFT processing to the digital signal for one period (corresponding to 1023 chips) of a spreading code with the phase being shifted sequentially by one chip.

As the FFT processing section 103, the frequency analysis apparatus according to the first embodiment or the second embodiment of the present invention, described before, is used. The spectrum spreading signal, which is also a received signal in the GPS receiver, is a real signal, and the second embodiment can be applied as is.

In the GPS receiver in this case, the results of FFT stored in the RAMs of the latter-stage calculation means 2 or 12 are all written into a memory 104. The results of FFT of the received signal, read from the memory 104 are sent to a multiplication section 105.

A spreading-code generation section 106 generates a spreading code of the same sequence as the spreading code used in the received signal from the satellite, which is to be processed by the DSP 100. The spreading code for one period (1023 chips) is sent from the spreading-code generation section 106 to an FFT processing section 107.

As the FFT processing section 107, the frequency analysis apparatus according to an embodiment of the present invention, described above may be used. The results of FFT processing are sent to a memory 108. The results of FFT are sequentially read from a lower frequency as in a usual case and sent to the multiplication section 105.

The multiplier 105 multiplies the result of FFT processing of the received signal sent from the memory 104 by the result of FFT processing of the spreading code sent from the memory 108 to calculate the degree of correlation between the received signal and the spreading code in a frequency domain. Actually, in the multiplication section 105, the complex conjugate of one of the result of discrete Fourier transform of the received signal and the result of discrete Fourier transform of the spreading code is multiplied by the other. Specifically, the complex conjugate of the result of FFT read from the memory 108 (or the memory 104) is calculated by a calculation section (not shown), and is sent to the multiplication section 105. Alternatively, before the result of FFT is written into the memory 108 (or the memory 104), the complex conjugate thereof may be calculated. The result of multiplication is sent to an inverse-FFT processing section 109, and the signal in the frequency domain is converted back to a signal in the time domain.

The result of inverse-FFT processing obtained from the inverse-FFT processing section 109 is a correlation detection signal of the received signal and the spreading code in the time domain. This correlation detection signal is sent to a correlation-point detection section 110. The correlation-point detection section 110 determines whether the received signal has been synchronized with the spreading code. When it is determined that they have been synchronized, the phase of a peak is detected as a correlation point.

Figure 15:
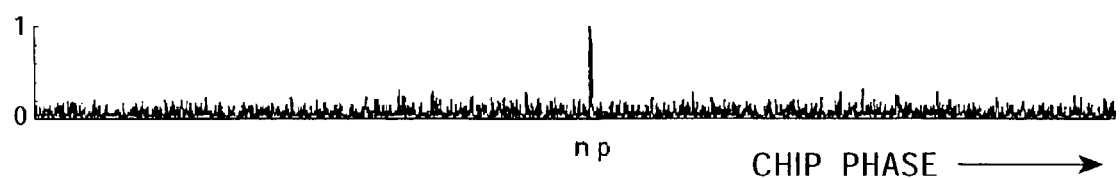
FIG. 15 is a view showing an example spectrum of a correlation detection output.

This correlation detection signal indicates a correlation value at each chip phase in one period of the spreading code. When the spreading code in the received signal is synchronized with the spreading code sent from the spreading-code generation section 106, a correlation waveform is obtained as shown in FIG. 15, in which a correlation value at the phase of one chip among 1023 chips shows a peak which exceeds a threshold determined in advance. The chip phase having the peak is the phase of a correlation point.

When the spreading code in the received signal is not synchronized with the spreading code sent from the spreading-code generation section 106, a correlation waveform having a peak as shown in FIG. 15 is not obtained. There is no peak which exceeds the threshold determined in advance at any chip phase.

The correlation-point detection section 110 determines, for example, whether a correlation detection signal sent to the correlation-point detection section 110 has a peak which exceeds the threshold determined in advance, to determine whether the received signal has been synchronized with the spreading code. When it is determined that they have been synchronized, the phase of the peak is detected as a correlation point.

In the above description, the carrier of the received signal is not considered. Actually, the received signal r(n) includes a carrier as indicated by expression (6) of FIG. 20. In expression (6), "A" indicates an amplitude, d(n) indicates data, $f_0$ indicates a carrier angular frequency in an intermediate-frequency signal, and n(n) indicates noise.

When a sampling frequency is called fs and the number of sampling times is called "N" (therefore $0 \leq n < N$ and $0 \leq k < N$) in the A/D converter 101, the relationship between a discrete frequency k and an actual frequency f after discrete Fourier transform satisfies: $f = k \cdot fs/N$ at $0 \leq k \leq N/2$, and $f = (k-N) \cdot fs/N$ at $N/2 < k < N$. Due to a characteristic of discrete Fourier transform, R(k) and C(k) are circulative when K<0 and K≦N.

To obtain data d(n) from the received signal r(n), it is necessary to synchronize a spreading code c(n) with a carrier $\cos 2\pi n f_0$ and to remove the carrier component. In other words, when only R(k) includes the carrier component in expression (5) of FIG. 20, described later, a waveform like that shown in FIG. 15 is not obtained.

In the present embodiment, a simple structure just having FFT processing in the frequency domain allows the spreading code c(n) and the carrier $\cos 2\pi n f_0$ to be synchronized and the carrier component to be removed.

Specifically, the results of FFT of a received signal from a GPS satellite, obtained by the FFT processing section 103, are read from the memory 104 in an ascending order of frequency of the frequency components of the received signal and sent to the multiplication section 105 in usual cases. In the present embodiment, however, the results of FFT of the received signal are sequentially read from the memory with the reading addresses being shifted by the control of a reading-address control section 111.

Information on the carrier frequency of the received signal, detected according to a correctly estimated amount of Doppler shift for the GPS satellite from which the received signal was sent and according to a correctly calibrated oscillation frequency and time information inside the GPS receiver is sent to the reading-address control section 111. The information on the carrier frequency can be generated only by the GPS receiver, but usually is obtained from the outside.

Then, the reading-address control section 111 shifts the reading addresses by the carrier frequency according to the obtained information on the carrier frequency, sequentially reads the results of FFT of the received signal from the memory 104, and sends them to the multiplication section 105.

When the results of FFT of the received signal r(n) is read from the memory 104 with the reading addresses being shift by the carrier frequency of the received signal in this way, the results of FFT equal to the results of FFT of the received signal from which the carrier component has been removed is obtained, as described later. When the results of multiplications of the results of FFT of the received signal from which the carrier component has been removed and the results of FFT of the spreading code for one period thereof are de-spread, a correlation detection output having a peak at a correlation point as that shown in FIG. 15 is always obtained.

As described later, it is also possible that the carrier component of the received signal r(n) is added to the results of FFT of the spreading code by controlling not the reading address for the results of FFT read from the memory 104 but the reading address for the results of FFT of the spreading code read from the memory 108, and the carrier component is substantially removed by the multiplications in the multiplication section 105.

The removal of the carrier component enabled by the synchronization of the carrier of the received signal and the spreading code by the control of the reading addresses of the memory 104 or 108 will be described below in more detail together with the operation of the processing of a digital matched filter in the DSP 100.

In the present embodiment, the processing of a digital matched filter is performed in the DSP 100. The principle of the processing of the digital matched filter is based on a theorem in which convolutional Fourier transform in the time domain is a multiplication in the frequency domain, as shown in expression (4) of FIG. 20.

In expression (4), r(n) indicates a received signal in the time domain, and R(k) indicates the discrete Fourier transform thereof. In addition, c(n) indicates a spreading code sent from the spreading-code generation section, C(K) indicates the discrete Fourier transform thereof, "n" indicates a discrete time, "k" indicates a discrete frequency, and F[ ] indicates Fourier transform.

When a correlation function of the two signals r(n) and c(n) is defined as f(n), F(k) which shows the discrete Fourier transform of f(n) has a relationship shown in expression (5) of FIG. 20. Therefore, when it is assumed that r(n) is a signal sent from the A/D converter 101 shown in FIG. 14 and c(n) is a spreading code sent from the spreading-code generation section 106, the correlation function f(n) of r(n) and c(n) can be calculated in the following procedure by using expression (5) without using a usual definition expression.

Calculate R(k) which is the discrete Fourier transform of the received signal r(n).

Calculate the complex conjugate $\overline{C}$ (k) of C(k) which is the discrete Fourier transform of the spreading code c(n).

Calculate F(k) in expression (2) by using R(k) and the complex conjugate $\overline{C}$ (k) of C(k).

Calculate a correlation function f(n) by applying inverse discrete Fourier transform to F(k).

When the spreading code included in the received signal r(n) matches the spreading code c(n) sent from the spreading-code generation section 106, as described above, the correlation function f(n) calculated according to the above procedure has a time waveform that has a peak at a correlation point as shown in FIG. 15.

Next, the synchronization of the carrier included in the received signal r(n) and the spreading code will be described.

As described before, the received signal r(n) includes the carrier as indicated by expression (6) of FIG. 20. To obtain the data d(n) from the received signal r(n), it is necessary to synchronize the spreading code c(n) with the carrier $\cos 2\pi n f_0$ and to remove the carrier component. In other words, when only R(k) includes the carrier component in expression (5) of FIG. 20, described before, a waveform like that shown in FIG. 15 is not obtained.

When the amount of Doppler shift is correctly estimated and the oscillation frequency and the time information of the GPS receiver are correct, the carrier frequency $f_0$ of the received signal r(n) becomes known. In this case, as shown in FIG. 16, it is possible to remove the carrier component from the received signal r(n) before FFT by providing a multiplication section 121 at a stage prior to the FFT processing section 103 and by multiplying the received signal r(n) by the carrier having the frequency $f_0$ sent from a signal generation section 122 in the multiplication section 121 for frequency conversion.

In this case, since the results of FFT of the received signal r(n) from which the carrier component has been removed are obtained from the memory 104, and the results of FFT are multiplied by the results of FFT of the spreading code c(n) in the multiplication section 105, a time waveform having a peak at a correlation point as in FIG. 15 is always obtained as the output of the inverse-FFT processing section 109.

Figure 16:
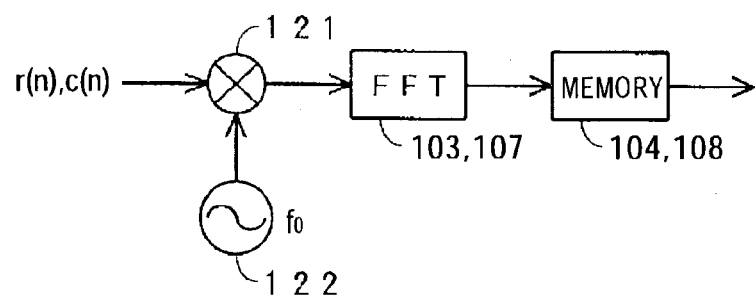
FIG. 16 is a view showing a general example of a method for acquiring the synchronization between the carrier of a received signal and a spreading code.

As shown by parentheses in FIG. 16, the same result is obtained when the carrier component is added to the spreading code without removing the carrier component from the received signal r(n), by providing the multiplication section 121 at a stage prior to the FFT processing section 107 and by multiplying the spreading code c(n) by the carrier having the frequency $f_0$ sent from the signal generation section 122 in the multiplication section 121 for frequency conversion.

In this case, since the carrier component included in the results of FFT of the received signal read from the memory 104 is synchronized with the added carrier component included in the results of FFT of the spreading code read from the memory 108, a correlation detection output having a peak at a correlation point as in FIG. 15 is obtained from the inverse-FFT processing section 109.

In the method described above in which the signal in the time domain is multiplied by the carrier-frequency signal as shown in FIG. 16, however, the multiplication section used for removing the carrier component is especially required, the structure becomes complicated, and the processing speed becomes slower by the multiplications.

As a characteristic of FFT, the above-described frequency multiplications can be expressed by expression (7) of FIG. 20. In expression (7), F[ ] indicates discrete Fourier transform, $\phi_0$ is a phase difference from the carrier, $k_0$ is k corresponding to $f_0$, and $f_0 = k_0 \cdot f_s/N$. From expression (7), a signal obtained by applying FFT processing to the signal frequency-converted from the received signal r(n) as shown in FIG. 16 is R(k) obtained by applying FFT processing to r(n) and shifted by the carrier frequency $k_0$.

Figure 17:
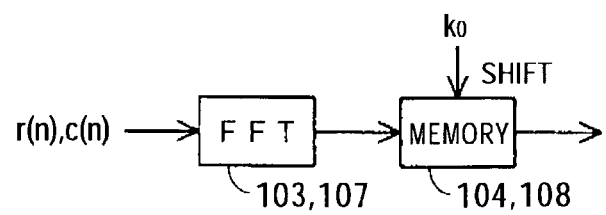
FIG. 17 is a view showing a method for acquiring the synchronization between the carrier of a received signal and a spreading code in an embodiment of the present invention.

From the above description, the structure shown in FIG. 16 can be changed to a structure shown in FIG. 17. More specifically, instead of multiplying the received signal r(n) or the spreading code c(n) by the carrier frequency, the reading addresses used when the results of FFT of the received signal or the results of FFT of the spreading code are read from the memory 104 or the memory 108 are shifted by the carrier frequency.

In this case, when the received signal r(n) is shifted, down conversion is used with $k_0 > 0$, and when the spreading code c(n) is shifted, up conversion is used with $k_0 < 0$, in FIG. 17.

As described above, when the FFT characteristic shown in expression (7) is used, the signal generation section 122 shown in FIG. 16 is not required. In addition, as shown in FIG. 17, since only the reading address phases used for reading the results of FFT from the memory need to be shifted, the structure is simplified, and the processing is made faster.

Since the phase difference $\phi_0$ in expression (7) is unknown, it is ignored in FIG. 17. For example, a correlation function f'(n) ($0 \leq n < N$) obtained as the result of inverse-FFT calculations of F'(k) calculated by expression (8) of FIG. 20 is a complex number. When its real part is called $f_R'(n)$ and its imaginary part is called $f_I'(n)$, the amplitude |f'(n)| of a correlation peak is obtained as shown in expression (9) of FIG. 20 and the phase $\phi$ is obtained as shown in expression (10) of FIG. 20. Therefore, the multiplication of $\exp(j\phi_0)$ at the right side of expression (7) may be omitted. The phase $\phi$ is obtained by adding $\phi_0$ in expression (7) to two values apart by $\pi$, corresponding to the sign of the data d(n) in expression (6)

Figure 18:
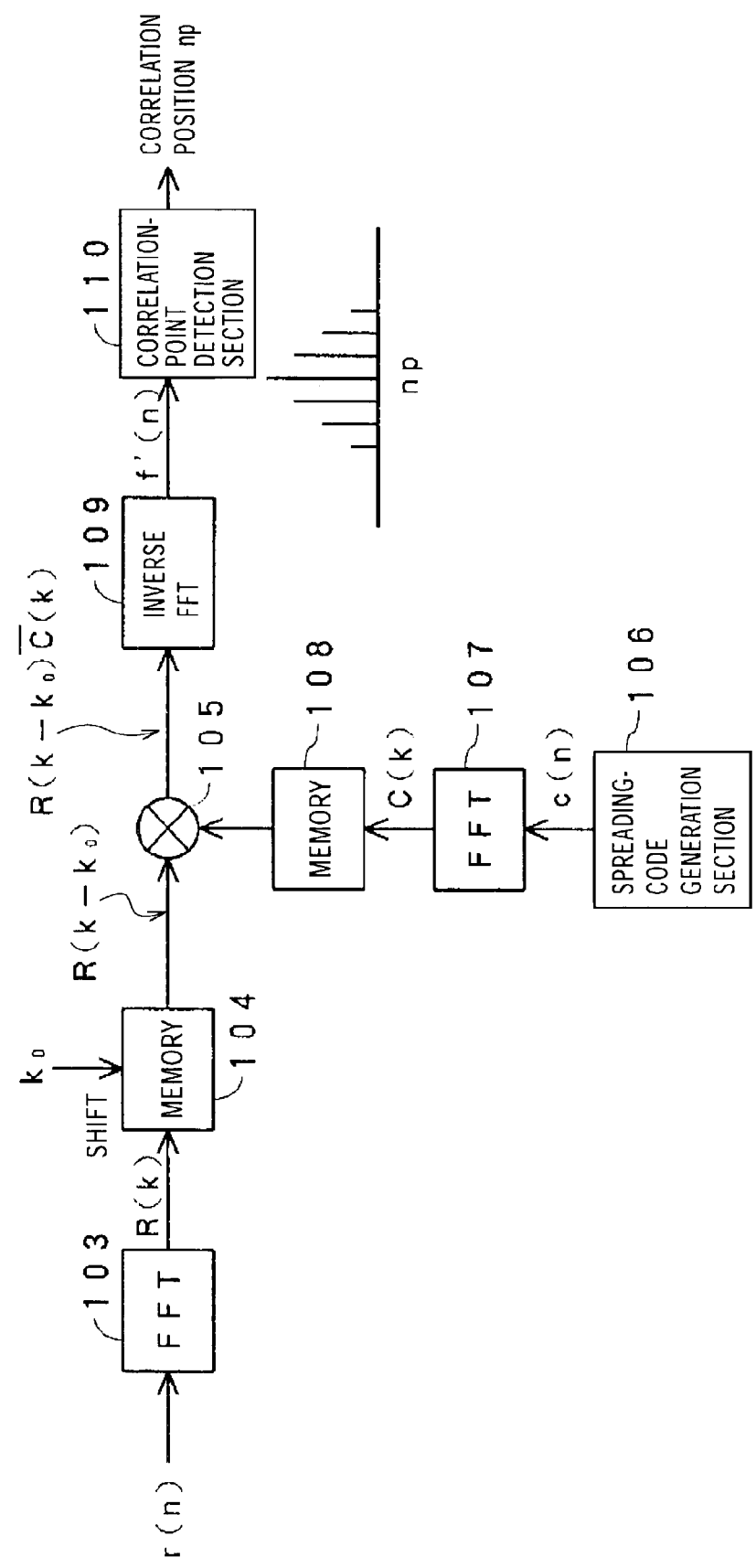
FIG. 18 is a view showing the structure of a main section in the first embodiment with its operation being taken into account.

FIG. 18 shows a structural view obtained when the processing operation described above is applied to the block view of FIG. 14. At the outputs of blocks shown in FIG. 18, signal outputs r(n) and c(n), and the results R(k), C(k), and f'(n) of calculations like those described above are shown.

As described above, according to the demodulation method for spectrum spreading code, having the structure shown in FIG. 14, when FFT is used to form a digital matched filter in a GPS receiver, the results of FFT of a received signal are multiplied with the spreading code with the addresses of a memory being shifted by the value corresponding to a carrier frequency, as shown in FIG. 18. A correlation point np is obtained, for example, in a waveform like that shown in FIG. 18. When a correlation point np is obtained for each of four GPS satellites, that is, for four spreading codes c(n), the position of the GPS receiver can be calculated.

In other words, according to the embodiment shown in FIG. 14, when the processing of a digital matched filter which uses FFT is performed, the carrier component of a received signal can be removed by a simple method in which one of the results of FFT of the received signal and the results of FFT of the spreading code is shifted when the results of FFT of the received signal and the results of FFT of the spreading code are multiplied in the frequency domain, without performing multiplications in the time domain to synchronize the carrier of the received signal with the spreading code.

As described before, when the frequency analysis method according to the first and second embodiments of the present invention is applied to the FFT processing section 103 and the FFT processing section 107 in the demodulation apparatus for spectrum spreading signals shown in FIG. 14, the structure of the DSP 100 is simplified, and high-speed processing is expected. An input signal to the demodulation apparatus for spectrum spreading signals is a real signal, and the second embodiment can also be applied as is.

In the above-described cases, the reading addresses of the memory used for R(k), which is the results of FFT of the received signal, are shifted. The reading addresses of the memory used for C(k), which is the results of FFT of the spreading signal, may be shifted (corresponding to up conversion in the multiplication section) in the direction opposite that used for R(k), which is the results of FFT of the received signal.

In the above description, the spreading-code generation section 106 and the FFT processing section 107 are separately provided. FFT calculations for the spreading code c(n) performed when a satellite signal is received can be omitted if the spreading code corresponding to each GPS satellite is FFT-processed and stored in a memory.

In the above-described embodiment, the carrier frequency of the received signal from the GPS satellite is known. When the carrier frequency is unknown, the same result is obtained by sending the correlation detection output of the correlation-point detection section 110 to the reading-address control section 11 and by searching for the amount of shift which is applied to the reading addresses of the results of FFT from the memory 104 and which causes a peak like that shown in FIG. 15 to be obtained.

More specifically, in this case, the reading-address control section 111 changes the amount of shift applied to the reading address of the results of FFT of the received signal r(n) from the memory 104, according to the correlation detection output of the correlation-point detection section 110, around an estimated address determined from past data, so that the correlation-point detection section 110 obtains a peak like that shown in FIG. 15. When the correlation-point detection section 110 obtains a peak like that shown in FIG. 15, the reading-address control section 111 stops the shift control of the reading addresses at the amount of shift used at that time.

A frequency analysis method according to the present invention can be applied not only to the above-described GPS receiver but also to various frequency analyses.

As described above, according to a frequency analysis method of the present invention, calculations for discrete Fourier transform can be performed at a high speed with a smaller number of memories or a smaller capacity of a memory than in usual FFT, and frequency components can be analyzed without reducing the frequency resolution.

In this case, a larger amount of calculations is performed than in usual FFT as the memory is reduced, but that amount is greatly smaller than the amount of calculations required when the calculations are performed according to the definition of discrete Fourier transform.

The invention claimed is:

1. A frequency analysis method using a-power-of-two $N_A=2^a$, where "a" is an integer, memories for discrete Fourier transform, comprising:
    a former-stage calculation step of taking out frequency components of an input signal having a-power-of-two $N_B=2^b$, where "b" is an integer and b>a, data items, in a comb manner and of calculating $N_A$ intermediate data items, a latter-stage calculation step of applying fast Fourier transform to the intermediate data items obtained in the former-stage calculation step, by using the $N_A$ memories for discrete Fourier transform, and
    executing the former-stage calculation step and the latter-stage calculation step a predetermined number of times with the frequency components taken out in the comb manner being changed, to execute discrete Fourier transform through the predetermined number of times for determining the position of a receiver and time information of a GPS satellite.

2. The frequency analysis method according to claim 1, wherein
    the predetermined number of times is $2^{b-a}$.

3. The frequency analysis method according to claim 1, wherein
    the input signal is a signal having no imaginary part and in the latter-stage calculation step, as the results of fast Fourier transform of some data items among the intermediate data items, a part of other intermediate data items, in which signs of imaginary parts are inverted and data items are re-arranged is output; and wherein
    processing in the former-stage calculation step and FFT calculations in the latter-stage calculation step are omitted for the part of the intermediate data items.

4. A spectrum-spreading-signal demodulation method comprising the steps of:
    applying discrete Fourier transform to a received signal in which a carrier wave is modulated by a signal obtained by spectrum-spreading data with a spreading code;
    detecting correlation between the received signal and the spreading code by multiplying the complex conjugate of one of the results of discrete Fourier transform of the received signal and the results of discrete Fourier transform of the spreading code by the other;
    detecting a correlation point of the received signal and the spreading code by applying inverse Fourier transform to results of multiplying,
    wherein in the step of applying discrete Fourier transform to the received signal,
    using a-power-of-two $N_A=2^a$, where "a" is an integer, memories for discrete Fourier transform in executing
    a former-stage calculation step of taking out frequency components of an input signal having a-power-of-two $N_B=2^b$, where b is an integer and b>a, data items, in a comb manner and of calculating $N_A$ intermediate data items, and executing
    a latter-stage calculation step of applying fast Fourier transform to the intermediate data items obtained in the former-stage calculation step, by using the $N_A$ memories for discrete Fourier transform, wherein
    the former-stage calculation stip and the latter-stage calculation step are executed a predetermined number of times with the frequency components taken out in the comb manner being changed, thereby to execute discrete Fourier transform through the predetermined number of times for demodulating the received spectrum-spreading signal.

5. The spectrum-spreading-signal demodulation method according to claim 4, wherein
    the predetermined number of times is $2^{b-a}$.

6. A spectrum-spreading-signal demodulation method according to claim 4, wherein
    in the latter-stage calculation step, as the results of fast Fourier transform of a part of the intermediate data items, the results of fast Fourier transform of other intermediate data items, in which the signs of imaginary parts are inverted and data items are re-arranged, are output; and
    processing in the former-stage calculation step and FFT calculations in the latter-stage calculation step are omitted for the part of the intermediate data items.

7. A frequency analysis apparatus comprising:
    a-power-of-two $N_A=2^a$, where "a" is an integer, memories for discrete Fourier transform;
    former-stage calculation means for taking out frequency components of an input signal having a-power-of-two $N_B=2^b$ data items, where "b" is an integer and b>a, in a comb manner and for calculating $N_A$ intermediate data items;
    latter-stage calculation means for applying fast Fourier transform to the intermediate data items obtained by the former-stage calculation means by using the $N_A$ memories for discrete Fourier transform; and
    calculation control means for applying a series of calculations performed by the former-stage calculation means and the latter-stage calculation means to the input signal a predetermined number of times with the frequency components taken out in the comb manner being changed, thereby to execute discrete Fourier transform through the predetermined number of times for determining the position of a receiver and time information of a GPS satellite.

8. The frequency analysis apparatus according to claim 7, wherein
the predetermined number of times in the calculation control means is $2^{b-a}$.

9. The frequency analysis apparatus according to claim 7, wherein
the input signal is a signal having no imaginary part and
the latter-stage calculation means outputs as the results of fast Fourier transform of a part of the intermediate data items, the results of fast Fourier transform of other intermediate data items in which the signs of imaginary parts are inverted and data items are re-arranged; and
the calculation control means controls so as not to apply processing in the former-stage calculation step and FFT calculations in the latter-stage calculation step to the part of the intermediate data items.

10. A spectrum-spreading-signal demodulation apparatus comprising:
received-signal Fourier transform means for applying discrete Fourier transform to a received signal in which a carrier wave is modulated by a signal obtained by spectrum-spreading data with a spreading code;
multiplication means for multiplying the complex conjugate of one of the results of discrete Fourier transform of the received signal and the results of discrete Fourier transform of the spreading code used in the received signal, by the other;
inverse Fourier transform means for applying inverse Fourier transform to the results of multiplications obtained by the multiplication means to obtain a correlation detection output of the received signal and the spreading code; and
means for detecting a correlation point of the received signal and the spreading code by searching for a peak of correlation of the received signal and the spreading code according to the correlation detection output obtained by the inverse Fourier transform means, wherein the received-signal Fourier transform means includes:
a-power-of-two $N_A=2^a$, where "a" is an integer, memories for discrete Fourier transform;
former-stage calculation means for taking out frequency components of an input signal having a-power-of-two $N_B=2^b$ data items, where b is an integer and b>a, in a comb manner and for calculating $N_A$ intermediate data items;
latter-stage calculation means for applying fast Fourier transform to the intermediate data items obtained by the former-stage calculation means, by using the $N_A$ memories for discrete Fourier transform; and
calculation control means for applying a series of calculations performed by the former-stage calculation means and the latter-stage calculation means to the input signal a predetermined number of times with the frequency components taken out in the comb manner being changed, to execute discrete Fourier transform through the predetermined number of operations for demodulating the received spectrum-spreading signal.

11. The spectrum-spreading-signal demodulation apparatus according to claim 10, wherein
the predetermined number of times in the calculation control means is $2^{b-a}$.

12. The spectrum-spreading-signal demodulation apparatus according to claim 10, wherein
the latter-stage calculation means outputs, as the results of fast Fourier transform of a part of the intermediate data items, the results of fast Fourier transform of other intermediate data items, in which the signs of imaginary parts are inverted and data items are re-arranged; and
the calculation control means controls so as not to apply processing in the former-stage calculation step and FFT calculations in the latter-stage calculation step to the part of the intermediate data items.

13. The spectrum-spreading-signal demodulation apparatus according to claim 10, wherein the received-signal Fourier transform means is formed of a digital signal processor.

* * * * *

UNITED STATES PATENT AND TRADEMARK OFFICE
CERTIFICATE OF CORRECTION

PATENT NO. : 7,203,250 B2
APPLICATION NO. : 10/362655
DATED : April 10, 2007
INVENTOR(S) : Katsuyuki Tanaka and Manabu Nitta It is certified that error appears in the above-identified patent and that said Letters Patent is hereby corrected as shown below:

In Column 4, Line 18, "$N^B$" should read --$N_B$--;

In Column 21, Line 54, insert --thereby-- immediately before "to";

In Column 21, Line 63, delete the second occurrence of "the";

In Column 22, Line 3, insert --other-- immediately before "intermediate";

In Column 22, Line 10, "the" should read --a--;

In Column 22, Line 11, insert --the-- immediately before "discrete";

In Column 22, Line 12, delete "the";

In Column 22, Line 16, insert --the step of-- immediately before "multiplying";

In Column 22, Line 30, "stip" should read --step--;

In Column 22, Line 40, "A" should read --The--;

In Column 22, Line 50, insert --other-- immediately before "intermediate";

In Column 23, Line 27, "the" should read --a--;

In Column 23, Line 30, insert --spreading-- immediately after "in";

In Column 23, Line 33, delete "the"; and

UNITED STATES PATENT AND TRADEMARK OFFICE
CERTIFICATE OF CORRECTION

| | |
|---|---|
| PATENT NO. | : 7,203,250 B2 |
| APPLICATION NO. | : 10/362655 |
| DATED | : April 10, 2007 |
| INVENTOR(S) | : Katsuyuki Tanaka and Manabu Nitta |

It is certified that error appears in the above-identified patent and that said Letters Patent is hereby corrected as shown below:

In Column 24, Line 37, insert --other--.

Signed and Sealed this

Third Day of June, 2008

JON W. DUDAS
*Director of the United States Patent and Trademark Office*